United States Patent
Höhener et al.

(10) Patent No.: US 11,641,861 B2
(45) Date of Patent: May 9, 2023

(54) SELF-OPTIMIZING, ADAPTIVE INDUSTRIAL CHOCOLATE PRODUCTION SYSTEM, AND CORRESPONDING METHOD THEREOF

(71) Applicant: Bühler AG, Uzwil (CH)

(72) Inventors: Manuel Höhener, Uzwil (CH); Fabian Dintheer, Uzwil (CH); Cornelia Koller, Neustadt an der Donau (DE); Armin Metzger, Kreuzlingen (CH); Frank Barthel, Horgen (CH); Bernd Schmidt, Kirchberg (CH); Tobias Nüssle, Constance (DE); Daniel Egli, St. Gallen (CH); Oliver Fässler, Sulgen (CH)

(73) Assignee: BÜHLER AG, Uzwil (CH)

( * ) Notice: Subject to any disclaimer, the term of this patent is extended or adjusted under 35 U.S.C. 154(b) by 810 days.

(21) Appl. No.: 16/608,207

(22) PCT Filed: Apr. 26, 2017

(86) PCT No.: PCT/EP2017/059985
§ 371 (c)(1),
(2) Date: Oct. 25, 2019

(87) PCT Pub. No.: WO2018/196970
PCT Pub. Date: Nov. 1, 2018

(65) Prior Publication Data
US 2021/0127701 A1 May 6, 2021

(51) Int. Cl.
*A23G 1/16* (2006.01)
*A23G 1/12* (2006.01)
(Continued)

(52) U.S. Cl.
CPC .............. *A23G 1/125* (2013.01); *A23G 1/005* (2013.01); *A23G 1/0033* (2013.01);
(Continued)

(58) Field of Classification Search
None
See application file for complete search history.

(56) References Cited

U.S. PATENT DOCUMENTS 4,620,477 A  11/1986 Ripani et al.
5,320,427 A * 6/1994 Callebaut ............... A23G 1/125
366/186

(Continued)

FOREIGN PATENT DOCUMENTS

EP        1043070 A1    10/2000

OTHER PUBLICATIONS

International Search Report and Written Opinion dated Jan. 25, 2018 for PCT/EP2017/059985 filed on Apr. 26, 2017, 12 pages.
(Continued)

*Primary Examiner* — Jacob T Minskey
*Assistant Examiner* — Adrien J Bernard
(74) *Attorney, Agent, or Firm* — Xsensus LLP

(57) ABSTRACT

Proposed is a self-optimizing, adaptive industrial chocolate production system (1), and method thereof. The system comprising a chocolate mass processing line (11) with at least dosing means (2), one or more mixers (3), one or more refiners (4), one or more conches (5), and liquefying and tempering means (6). Appropriate inter-dependent operational parameters of the various devices (2/3/4/5/6) are measured by real-time measuring devices and transmitted to a controller device 12. The measured inter-dependent operational parameters are mutually optimized and dynamically adjusted providing an optimal operation at least in terms of the characteristics of the end chocolate mass 7 and/or
(Continued)

throughputs of the chocolate production line 11 and/or other operation conditions as energy consumption.

29 Claims, 5 Drawing Sheets

(51) Int. Cl.
    *A23G 1/00*     (2006.01)
    *A23G 1/04*     (2006.01)
    *A23G 1/18*     (2006.01)

(52) U.S. Cl.
    CPC ......... *A23G 1/0043* (2013.01); *A23G 1/0096* (2013.01); *A23G 1/045* (2013.01); *A23G 1/16* (2013.01); *A23G 1/18* (2013.01)

(56) References Cited

U.S. PATENT DOCUMENTS

| | | | |
|---|---|---|---|
| 2007/0202241 A1* | 8/2007 | Abaurre | A23G 1/125 |
| | | | 426/660 |
| 2009/0238928 A1 | 9/2009 | Bernauer | |
| 2016/0193609 A1 | 7/2016 | Ellermeijer | |
| 2018/0360066 A1* | 12/2018 | Andersen | C11B 15/00 |

OTHER PUBLICATIONS

"Bühler Magazine Chocolate Solutions to suit all taste", Retrieved from the Internet URL: https://www.buhlergroup.com/global/en/downloads/Diagram_167_EN.pdf, on Jan. 11, 2018.

\* cited by examiner

SELF-OPTIMIZING, ADAPTIVE INDUSTRIAL CHOCOLATE PRODUCTION SYSTEM, AND CORRESPONDING METHOD THEREOF

CROSS-REFERENCE TO RELATED APPLICATION

The present application is the US national phase of PCT/EP2017/059985, filed Apr. 26, 2017, which is incorporated herein by reference.

FIELD OF THE INVENTION

The present invention relates to a self-optimizing, adaptive industrial chocolate production system. In particular, it relates to adaptive process optimization of chocolate mass processing line with at least dosing means, one or more mixers, one or more refiners, one or more conches, and liquefying and tempering means.

BACKGROUND OF THE INVENTION

Many industrial processes function under varying operating conditions and show intrinsic inter-machine dependencies of the operating parameters, the operating conditions, the various input materials, intermediate products and finished products. This generally presents a problem for the design of appropriate control systems, monitoring systems and interacting steering devices, also referred as industrial process control systems. The variations of the related or unrelated operating conditions are in many process complex, showing a complex evolution of parameter value pattern and/or measuring control parameter pattern. Effectively, both conventional and advanced control systems currently operating in industry are designed incorporating fixed parameters. These parameters can be adjusted to meet specific operating conditions but when these conditions vary, the process dynamics may change and the performance of the control system may deteriorate, resulting in oscillations and instability. Thus, it is desirable that controllers incorporate adaptive mechanisms that carries out a real-time process dynamics identification and a controller parameter self-tuning adjustment that avoids deterioration of control performance when operating conditions or process dynamics change. It predicts, guides and stabilizes the evolution of process variables in a desired way, and customizes the controller configuration for the various process domains of operation to yield what is sometimes referred as Optimized Adaptive Control Performance. An optimized control system should be able to drive the process variables along desired trajectories by using suitably bounded control signals, and achieve and maintain in real time process stability in their optimal operating points, in spite of changes in process dynamics and operational context, and the presence of noise and perturbations.

In industry, chocolate mass is made from fat or fat containing ingredients—usually cocoa butter and liquor, sometimes milk fat and particles, usually sugar, cocoa solids and sometimes dry milk products. Often an emulsifier is used to improve flow of hygroscopic particles within the continuous fat phase. During production, several incidents occur: (i) Reduction of large particle sizes by grinding, (ii) Covering each individual particle by fat/emulsifier to reduce particle interaction during flow, (iii) Removal of water contained in raw materials, as it would form undesired sticky layers on hygroscopic particles, (iv) Removal of undesired volatile off-flavors contained mainly in cocoa particles and developed during cocoa fermentation, (v) Flavor development. The steps (iv) and (v) can be combined, so they are not distinguishable in all production lines.

In older refiner conches, all these steps usually happened simultaneously and were hard to control, whereas the majority of later technologies perform the grinding step separately. However, due to interdependencies of the operational parameters in the different production steps influencing the characteristics of the end product, the in later technologies distinguished steps performed in different production devices are difficult to handle in order to achieve an optimized end product and production cycle. Further, only few mill types are able to handle chocolate preparations, as it is initially a very sticky mass, which can transform to a sticky powder during milling, when specific surface of particles increases. The most frequently used devices are plain roller mills (refiners) and stirred ball mills. Apart from milling, the other operations can be performed within a long-term kneading process called conching. Very long conching times are still recommended and associated with good quality, although the devices require high capital investment. One of the major progresses established in the last 30 years was to move cocoa flavor treatment out of the conch into the upstream cocoa processing. Thin film evaporators were developed in order to remove undesired volatiles and water; if this is not done elsewhere those devices are also able to debacterize cocoa liquor. In modern chocolate processing, chocolate producers can strongly reduce conching times if they insist on using pre-treated cocoa liquor of high flavor quality. Untreated cocoa is also still used, which then requires extra conching, like in former times. Similar principles are followed for milk chocolates by developing milk powder pre-treatment procedures. For example, skimmed milk powder can be dried to below one percent water and to coat it with fat, which allows to perform a very short liquefaction process instead of classical conching. Another ingredient is crumb, which in its basic is mixture of sugar, cocoa and milk, often used to make industrial chocolate. Crumb is made by drying milk together with sugar and cocoa liquor. Originally this was developed for preservation of the milk, but today it is performed in order to create the specific caramel flavor preferred in some countries. For downstream mass production, the same technologies can be used, as with other chocolate types. If cocoa butter is replaced by another fat, the product is usually called compound, not chocolate. Technologically most compounds are close to chocolate mass and similar equipment and production line can be used to make it. The largest difference is rather an economical one than a production one, as very expensive cocoa butter is replaced by relatively inexpensive alternative fats.

For the invention, it is important to understand, that the chocolate production cycle is long, complex and includes many different processing steps, each afflicted with various operating and processing parameters mostly with a complex inter-dependency among each other in relation to the characteristics of the end product. The described complexity finds it first grounds already at the very beginning of the chocolate production. Cocoa is a tree growing in the humid tropics, bearing fruit on its trunk and branches on a continuous basis. Cocoa pods typically are harvested by hand and carefully cut from the tree without damaging flower buds and immature pods. Thus, the chocolate production and characteristics already starts with the cocoa beans, how they are grown, harvested, extracted, fermented, dried, and even packed. For fermentation, the beans with their surrounding pulp are removed from the pods and placed in piles or bins, allowing access to micro-organisms so fermentation of the pectin-containing material can begin. Yeasts produce ethanol, lactic acid bacteria produce lactic acid, and acetic acid bacteria produce acetic acid. The fermentation process, which can take up to seven days, also produces several flavor precursors, eventually resulting in the familiar chocolate taste. Since the flavor depends strongly on the fermentation process, often the cocoa beans from several farmers are collected and mixed by local buyers, traders, local buying stations, and exporters until they reach the chocolate manufacturing plant. However, even by mixing and blending different products, several characteristics of chocolate still strongly depend on the processes done at the very beginning of the supply chain. Flavor compounds like polyphenol and flavor precursors like free amino acids and reducing sugars, are formed during the fermentation that cocoa producers do right after harvesting the cocoa pods. Based on the Maillard reaction, which takes place during the roasting process done during chocolate production, flavor precursors are transformed into flavor compounds, like aldehydes and pyrazines. These flavor compounds are jointly responsible for the flavor profile of the finished chocolate (see e.g. de Brito, E. S., Garcia, N. H. P., Gallão, M. I., Cortelazzo, A. L., Fevereiro, P. S., & Braga, M. R.; Structural and chemical changes in cocoa (*Theobroma cacao* L) during fermentation, drying and roasting. Journal of the Science of Food and Agriculture, 2001). It is well known that there are significant differences in the farming practices regarding growing, fermenting and drying the cocoa beans, defining many of the qualitative characteristics of the cocoa beans. For example, it is also well known that different fermentation methods are used for fermenting cocoa beans depending on farmers, areas and countries, strongly influencing the characteristics of the cocoa beans. In result, the chocolate manufacturers often receive very heterogeneous batches of cocoa beans due to the various farming practices. For these reasons, chocolate manufacturers mostly have only rough previous knowledge of the qualitative parameters of the cocoa beans, mainly evidenced by country of origin. In order to avoid country or supplier specific reliance, the processing parameters to produce chocolate are then adjusted on the expected characteristics of the blend of beans, most often only based on simple indicators such as the origin of the cocoa.

Characteristic flavors and product consistency are key to the production of chocolate and product quality. However, premium class chocolate requires not only good consistent raw materials but also total process control, since many of the quality parameters and chocolate characteristics are also determined by the processing and treatment of the cocoa beans ending up in the final product chocolate. To reproduce the same perfect quality every time, the production chain must be based on a system allowing to from an ideal recipe system provide and control important parameters such as materials, recipes, plasticity, raw-material, interstage and intermediate material information. Important goals to be achieved in a production chain are, inter alia, accurate and reproducible quality, minimal waste material due to bad batches, fast and accurate operation, full traceability of the product parameters during the processing, prevention of loss e.g. through correction of ingredients and/or adaption of processing steps etc. In the prior art, the process steps of the production chain, for example, may include: (i) Feeding and Cleaning: Automated or semi-automated feeding the cocoa beans from trucks, big bags, jute bags or other transport means to the chocolate processing system. There exist various feed hopper technologies, transport systems and storage silos which can e.g. be tailor-made realized to suit the special operation requirements, building conditions and/or line capacity demands. The feeding is followed by the cleaning of the cocoa beans to remove foreign material. This step e.g. prevents impairment of the downstream process. For the cleaning process, various more or less efficient cleaning machines exist in the prior art removing any foreign material, such as wooden particles, clusters, strings, sand and dust from the cocoa beans. For example, the cleaning may involve separation of glass, stones and other heavy material, which can e.g. be achieved using an air-flowed vibration sieve with special netting. The output product may be classified according its specific weight. For this, the cocoa beans may be fed though a batch weighing system, which measures the amount of cocoa beans and measures the capacities of the complete process. The combination of these measurements with other measurement systems, as for the liquor, powder and/or butter allowing to balance and optimize e.g. of the line efficiency of the chocolate processing system; (ii) Debacterization and roasting: Debacterization of the cocoa beans allows reducing the germ count without affecting the flavor. Roasting the cocoa beans brings out the flavor and color. The temperature, time and degree of moisture should be adjusted to the type of bean and the intended product. To achieve a good quality chocolate, typically the whole cocoa beans are roasted, the cocoa shells properly separated and grinded to the liquor. In the prior art roasters, the beans may be passed through the roaster by gravity and held in specified layers; during each cycle one small batch is dumped to the next level. Hot air passes through each layer from bottom to top. In this way, each bean can receive a predetermined amount of hot air and further allowing every bean to be equally roasted. Appropriate bean roasting guarantees that the flavors are retained in the nib. In this process, the shell helps to protect the nib against over-roasting and may be removed afterwards. The bean roasting process should prevent butter migrating from the nib to the shell. In chocolate processing, bean roasting typically is considered one of the crucial or kay parts in the processing of the cocoa. Important parameters for the roasting and pre-roasting process are adjustable to any kind of bean type and origin, level of automation, energy consumption, adjustability to bean characteristics and bean moisture, over roast control and prevention, selectability of energy source (steam, oil or gas), and labor cost/intensity; (iii) Winnowing: Typically, winnowing is performed after roasting. As discussed above, before winnowing, the beans may be debacterized and/or sterilized, for example, by steam. For this, the cocoa beans may be transferred from the roaster to a cocoa bean sterilizer. Important operating parameters of the debacterization and/or sterilization process are, inter alia, degree of possible pressure vessel temperatures, intake of moisture and energy consumption, degree of loosening of the shell, bacteria counts e.g. below 500 cfu per gram or the like, degree of risk of contamination of clean nibs, degree of release of the shell for optimum shell separation in downstream winnowing, capability and adaptability of low pressure steam treatment for moisture intake only on the shell, and velocity of emptying and filling procedure etc. Thereafter, winnowing allows removing the shells from the beans to leave just the cocoa nibs. Important parameters of the winnowing process are, inter alia, quality of cocoa (less wear on downstream grinding and refining machines), frequency control for breaking in different stages of bean treatment, adaptability of nib content in shell e.g. <0,1%, adaptability of shell content in nib e.g. <1,0%, adaptability and control of bean quality, and fineness/sizing of nibs etc. For systems using a nib roaster unit, the shell typically must first be removed with the winnower, which gently loosens the shell from the kernel. After winnowing, alkalizing can take place. Over the last 30 years, nib alkalization has been the most common method. It is still one of the most flexible system regarding flavor, color and pH influence. However, specialized alkalizing systems are also able to treat nibs with a very high moisture content. Important parameters are, inter alia, level of moisture at which the system is still capable to handle nibs e.g. in current state of the art systems up to 35%, achievable pH-values e.g. up to 8 or more, homogeneity of treatment of the nibs for uniform flavor development and energy consumption etc. In those systems, after drying in the alkalizing system, the pre-dried nibs are fed to the roaster resulting in the desired color and flavor development. After alkalization, the moisture must be evaporated of and discharged. A vacuum system can be used to speed up this drying process. The continuous nib roasting technique has several advantages. When using turning layers, all nibs are treated equally and uniform flavor development is achieved. The method can be used in both cocoa and chocolate production. Due to low energy consumption, it is a good roasting method for flexible flavor development. Typically, it also allows produce excellent end product color. High-acid and non-fermented beans can be upgraded to a less acidic and a more cocoa flavored product. Additional advantages may be, that the system can be adjusted to process any kind of bean type and origin and it is suitable for continuous, long-term production. The exhaust air has a lower concentration of odor due to the low roasting temperature. The continuous nib roaster has a cooling section to cool down the nibs to the ideal temperature for liquor grinding; (iv) Grinding: The nibs may be grinded in two stages into cocoa liquor (cocoa particles suspended in cocoa butter) with optimal flow characteristics. Trying to achieve a uniformly distributed energy density in the bead mill, masses can be produced with a very narrow particle size distribution. Different methods and technology are known in the state of the art for pre-grinding and grinding. For the grinding, cocoa nibs can e.g. be fed into the grinding chamber by a feeding screw or other means, where knives immediately start the grinding process. These knives are typically made from specially hardened steel that may help to reduce wear. The basic principles of grinding are well known in the art: The pre-ground liquor is pumped through the ball mill's grinding vessel in one or more stages. The refining action is accomplished by a special shaft with agitator arms and diverters rotating in a vertical jacketed grinding tank, which is filled with hardened steel balls. The various layers of grinding elements move in the same direction, but at different speeds. The design of the ball mill should be optimized preferable to achieve the highest possible capacity while requiring minimal energy. Important parameters of the grinding process are, inter alia, capacity and efficiency of the ball mill, eligibility of the size of the sieve, fineness etc.; (v) Mixing and kneading: An important part of the chocolate processing system is formed by producing the chocolate recipes. The ingredients—cocoa liquor, cocoa butter, sugar, milk and emulsifiers—are carefully mixed with the high shear and kneading action producing a homogeneous mass for further processing; (vi) Refining: In a next step, the chocolate mixture is refined and its texture but also flavor improved by passing through a series of rollers. Known in the state of the art are, for example, two-stage refining processes with flexible two-roll and/or five-roll refiners influencing various characteristics in terms of quality and efficiency; (vii) Conching: This process develops the flavor and rheology of the chocolate, releasing some of the inherent bitterness and finally gives the resulting chocolate its smooth, melt-in-your-mouth quality. During conching the chocolate is continuously kneaded and sheared over a period of hours depending on the flavor and texture desired by the manufacturer; (viii) Precrystallization: Appropriate seed precrystallization technology may produce chocolate products with improved gloss, denser crystal matrix, and higher strength. It may also support preventing fat bloom and storage stability can be considerably increased.

Concerning the chocolate mass properties, viscosity is an important measure. Chocolate mass is a suspension of particles in a continuous phase of liquid fat. Downstream when producing final products, fat crystallization is initiated and the mass is forced into the desired shape and solidifies. Various properties of the final product relate on measurable properties of the still liquid chocolate mass. Therefore, flow properties are usually measured at a temperature of 40° C., which is close to the temperature that chocolate melts in the mouths. Texture sensations like a smooth melt or a sticky behavior are usually correlated to flow properties. As chocolate mass is a non-Newtonian fluid, its shear stress has to be measured at different shear rates, which results in a flow curve. Shear stress divided by shear rate results in the apparent viscosity. This viscosity versus the shear rate provides a viscosity curve. Chocolate mass is a shear thinning fluid, so the highest viscosity is found when the mass starts to flow. Interaction between particles is considered to be responsible for this behavior, which is very different to Newtonian fluids such as water. Therefore, one important part of the flow curve is at very low shear. The yield value defines the shear stress, when the mass starts to move. As a minimum shear rate is necessary for the measurement, usually the yield value has to be extrapolated from the flow curve according to modelling predictions. Yield values or measurements at low shear stress also have a great practical importance, as many industrial operations are carried out with masses flowing slowly, for example the equal distribution of still liquid mass in a mold. However, some processing is done under high shear, e.g. when pumping or spraying masses. This is best described by the other end of the flow curve. So usually it is extrapolated to infinite shear, the result is then called Casson or Windhab infinite viscosity. Naturally, fat content, emulsifiers and ingredient properties have the largest influence on viscosity. After those, particle size distribution and particle package density are also important. Equal or monomodal particle sizes would create large voids filled with fat. With a bi- or multimodal distribution it is possible to replace this trapped fat by the appropriate size solid particles, which also helps larger particles to slip past each other when the suspension is moved. As already discussed, the grinding process largely influences particle size distribution and the resulting flow properties. Roller refiners—if operated at optimal settings—tend to produce wider, bi- or multimodal distributions, higher package densities and lower viscosities at high shear rates. In contrast, ball mills result in narrower distributions, less specific surface and lower yield values. Physically measurable properties of chocolate masses, like flow attributes or hardness, are correlated to sensory perceptions such as snap, hardness, melting and the like. So, in terms of texture it is possible to predict quality by measurements. This is much more difficult in terms of flavor. It is obvious, that white, milk and dark masses—ideally to be produced on the same equipment—taste different. However, there are a lot more varieties in each category up to the manufacturer-specific tastes that are aimed at by individual chocolate manufacturers. In general, it is impossible to define the flavor for high quality and to compare and identify equipment to achieve it. If considering processing alternatives, it will always be necessary to adapt recipes and technology to each other in order to get the desired result.

High quality reproducibility, mainly guaranteed by appropriate automation of the production process, are central for the chocolate production process. Thus, to make high-quality products, trouble free processes and complete traceability throughout the production process are necessary required and providing appropriate production lines is a strong demand in industry. Further, it is desirable, that it is possible to combine ease of operation, quality data management and analysis functionality by a chocolate production process system. The system should further allow for precise adjustment of fill quantities for liquid, pastry, powder or solid products immediately following filling by means of dynamically measured and traced measuring parameters and dynamically adapted processing means, as well as precise feedback and possible adaption to the characteristics of the raw material by prompting or closed loop control to the filling materials. Finally, the system should allow for optimizing and/or avoiding unnecessary material losses, and meeting legal fill quantities and average weight regulations. The production processes by the system should conform with internal and external standards such as ISO and GMP, in particularly by providing appropriate measuring and statistical data, to monitor, analyze and control profitability and quality.

The prior art document US2009238928A1 discloses a chocolate pre-refiner system comprising an inline measuring system measuring the changes in plasticity (consistency) of the re-fining chocolate moss in real-time. The roller gap distance of the two-roll pre-refiner is automatically adjusted providing a system-controlled plasticity control with a given plasticity parameter value. The prior art document "Bühler Magazine Chocolate Solutions to suit all taste" (2014) retrieved from www.buhlergroup.com/global/en/downloads/Diagram_167_EN.pdf shows the separated use of dosing devices, mixers, refiners, conches and tempering devices as known in the art. The prior art document EP1043070A1 discloses, inter glia, a self-adjusting refiner wherein the pressure between the rollers is adjusted based on a certain pattern of the chocolate mass exiting the refiner. The prior art document U.S. Pat. No. 4,620,477A discloses a self-adjusting refiner system wherein based on a certain value of plasticity of the chocolate paste the pressure on the refining roll bearings is adapted. Finally, US2016193609A1 discloses a self-adapting refiner system wherein the gap between the rolls is adapted based on the particle size distribution measured by a sensor in combination with a data processing device, wherein the sensor together with a processor are measuring and analyzing a spectrum of frequencies, especially near the infrared sub-spectrum. All the mentioned documents US2009238928A1, "Bühler Magazine Chocolate Solutions", EP1043070A1, U.S. Pat. No. 4,620,477A, and US2016193609A1 solely concern the automatization of a specific part of a chocolate production system and do not deal with its integration into a complete chocolate processing line.

SUMMARY OF THE INVENTION

It is one object of the present invention to provide a self-optimizing, adaptive inter-machine control system reacting, in real-time, dynamically on captured operational, environmental or initial feed product parameters of industrial chocolate production lines during operation. In particular, it is an object to provide an adaptive machine-to-machine control system working at the highest possible efficiency, for example, measuring the efficiency of the chocolate production and manufacturing operation as a rate of the overall equipment effectiveness (OEE; reference number 13 denotes the measurement of the OEE of the chocolate production with an OEE measuring device). Though, the OEE typically is not an absolute measure, the OEE is very well suited to identify a production line specific scope for process performance improvement. In this sense, the OEE measurement is commonly used as a key performance indicator (KPI) in conjunction with lean manufacturing parameters to provide an indicator of the performing and performing improvements of a production line. Therefore, it is a further object of the invention to provide a self-optimizing, adaptive inter-machine or machine-to-machine control system allowing to minimize the operational cost and used resources, as energy consumption, labor or production time. Another object of the invention is to avoid in the case of changing raw or feed material properties that possible operator decision or machine wear may cause undesired surprises. Further, it is also an object of the present invention, to provide an electronically steerable self-optimizing, adaptive control system and external electronical or digital control services optimizing the desired production targets at highest possible processing reliability of the chocolate production line operation. Another object of the invention is providing a unified, inter-machine controlling, steering and optimization of all processes leading to the creation of chocolate mass type: dosing, mixing, refining, conching, transportation to tanks and tempering. The system should be able to create and optimize a variety of recipes, with parameters for all technology machines performing their implementation: mixer, pre-refiner, refiner or possible selection of multiplicity of refiners and specified conches for receipt and conching of the chocolate mass.

According to the present invention, these objects are achieved, particularly, with the features of the independent claims. In addition, further advantageous embodiments can be derived from the dependent claims and the related descriptions.

According to the present invention, the above-mentioned objects for the self-optimizing, adaptive industrial chocolate production system are achieved, particularly, in that the system comprises a chocolate mass processing line with at least dosing means, one or more mixers, one or more refiners, one or more conches or one or more liquefyors and tempering means, wherein solid and/or liquid feed materials are precisely dosed, conveyed and discharged to the one or more mixers by the dosing means, wherein the feed materials are mixed and/or kneaded to a basic chocolate mass with a defined plasticity and homogeneity by the one or more mixers and transferred to the one or more refiners comprising pre-refiners and finers, wherein the basic chocolate mass is pre-processed to a chocolate mass with a predefinable plasticity and fineness by at least two pre-refiner's rollers having a controlled roller pressure and/or roller gap/distance and speed, and processed to a refiner chocolate mass with a predefinable powder fineness by a plurality of finer rollers having a controlled roller pressure and/or roller gap/distance and speed, and transferred to the one or more conches, wherein the refiner chocolate mass is processed to a conching chocolate mass with a given moisture, viscosity, texture and fat content by the one or more conches 5 and transferred to the tempering means, each of the conches 5 at least comprising a container or conche vessel having an inner surface and at least one moveable shaft or rotatable rotor situated inside said conche vessel, wherein shearing elements extend from said shaft towards said inner surface pressing the conching chocolate mass against the vessel surface during operation and/or between overlapping shearing elements, wherein the conching chocolate mass is processed to a predefined moisture, degree of crystallization, and fat content by adding cocoa butter and/or other fats by the liquefyor, and wherein the chocolate mass as final conching chocolate mass is processed to the end product at least by the tempering means varying temperature to achieving the predefined degree of crystallization measured by a temper meter, in that the pre-refiner comprises an inline, real-time measuring system measuring changes in the plasticity of the pre-fining chocolate mass, and in that the pressure and/or roller distance (gap) settings of the two-roll pre-refiner are automatically adjusted by means of the adaptive machine-to-machine control system providing an autonomous plasticity control with a given plasticity parameter value. The adaptive control system can e.g. systematically adjust the given plasticity parameter value based on measuring parameters of the refiner or by manual input to the adaptive control system. The pre-refiner can, for example, be realized as a two-roll refiner, with automatically adjustable gap-settings of the two rolls varying the gap between the rolls upon amending the gap-setting parameters. The inline, real-time measuring system can, for example, comprises at least a light source and/or an optical image capturing device and/or a measuring device for measuring the power consumption of the chocolate mass conveying device, wherein a throughput of the pre-fining chocolate mass is measured by line triangulation of the light source and the optical image capturing device, and wherein the plasticity of the pre-fining chocolate mass is dynamically controlled based on a constant throughput in combination with the measured power consumption of the chocolate mass conveying device. A topography of the chocolate mass can, for example, be assessed in the inlet zone of the rolls of the pre-refiner by the line triangulation based on the fan shape of the centrally projected laser or light source lines, wherein the throughput of the chocolate mass is dynamically measured based on the detected topography lines, and the pressure and/or roller distance (gap) settings of the two roll pre-refiner are automatically adjusted by means of the adaptive inter-machine control system to provide a predefined value of plasticity by keeping a constant throughput of the chocolate mass in combination with the measured power consumption of the conveying device. The light source can, for example, be realized as a laser or multiline laser or LED projectors and/or the optical image capturing device is realized as a camera or a multiline laser measuring sensor or triangulation sensor. The invention has inter alia the advantage, that the system provides a fully automated and autonomous plasticity control of the pre-refiner chocolate mass. This system provides the discussed real-time, non-invasive, inline measuring and control system, and is able to detect changes in the consistency of the pre-refined mass and adjusts the pressure or gap setting of the two-roll refiner automatically. It is composed of a laser/camera in combination with the evaluation and correlation of the motor power. The laser allows to assess the topography of the mass in the inlet zones of the two-roll pre-refiner. The camera can detect these topography lines and hence allows the constant measurement of the throughput. This constant throughput in combination with the measurement of the motor power of the conveying screw, allows an automated and accurate plasticity control and adaption. In contrast to this, in prior art systems, the operators had to regularly check and guarantee the mass plasticity and hence performance of the line. The automated and active control by means of the system allows achieving constant, target plasticity after the pre-refiner, thereby increasing productivity of the five-roll refiner (up to 3% capacity allowing a faster conche filling). Further, the system allows for reducing needed labor in terms of manual adaptation and cleaning efforts due to overfilling.

In an embodiment variant, the finer further comprises a non-invasive, real-time measuring system detecting vertical pattern of a roll coverage of at least one of the rolls of the finer with finer chocolate mass, wherein by means of pattern recognition the detected vertical pattern are compared to stored sample pattern of the pattern database, wherein in case of triggering specific error pattern, at least the roll temperature and/or the roll pressure are dynamically adapted by the self-optimizing, adaptive inter-machine control system providing a continuous control of the particle size distribution of finer mass and an dynamically optimized throughput of the finer. The non-invasive, real-time measuring system can, for example, detect vertical pattern of a roll coverage of the fifth roll of the finer. The non-invasive, real-time measuring system can, for example, comprise an optical image capturing device for imaging a surface on at least one of the rolls of the finer and for generating a corresponding surface image, where said optical image capturing device is arranged such the imaged region covers the whole working width of said at least one roll, and further comprises image processing means for processing said surface image. The non-invasive, real-time measuring system can, for example, be arranged to generate a control signal on the basis of said surface image and the detected vertical pattern, and to provide said control signal to adjusting means for adjusting and dynamically adapting operational parameters of said finer or chocolate production process lines devices providing a continuous control of the particle size of finer mass. The optical image capturing device can e.g. be a line scan camera and said surface image consists of a plurality of pixels arranged in one or more lines, each of said plurality of pixels representing an area of the surface being imaged and having a pixel value corresponding to physical characteristics of said area. For example, in case of triggering specific error pattern, at least the roll temperature and/or the roll pressure and/or the composition of the feed material and/or fluctuations of the cooling water temperature and/or variations in the ambient temperature can be dynamically adapted by the self-optimizing, adaptive control system providing a continuous control of the particle size of finer mass. This embodiment variant has inter alia the advantage that the system allows for a continuous control of particle size of the refiner chocolate mass, thereby increasing productivity of the five-roll finer (up to 15%). Further, less labor skills are required (manual adaptions) that in prior art systems, thus a more consistent performance and quality is achieved by the system. In addition, a longer lifetime of rolls is achieved due to constant and even roll wear. The real-time, non-invasive control system allows detecting vertical pattern of incomplete roll coverage at the 5th roll of the five-roll finer. These patterns are compared to a data basis of error pattern and the right adaptations of roll temperatures or pressure is performed. Thus, operators don't have to take this responsibility and can use this time for other process related tasks. The five-roll finer is one of the throughput bottle-neck in the chocolate mass line. To run the five-roll refiner with the highest possible throughput in an ideal state, the operator needs know-how and experience to find the right settings. The present system measures the roll coverage of the fifth roll, which depends on the incoming mass consistency, the target particle size but also on changes in the system environment like different raw materials, cooling water temperature fluctuations, ambient temperature changes etc. Over the detection of different patterns on the roll and comparison to a pattern database, the system corrects the corresponding machine parameters accordingly. The roll coverage on the fifth roll has a direct impact on throughput of the five-roll refiner. The better the coverage, the higher the throughput.

In another embodiment variant, the finer further comprises an optical, inline, non-invasive, real-time measuring system detecting the particle size of the finer chocolate mass, wherein the detected particle size of the finer chocolate mass is compared to a defined target particle size and in case of triggering a deviation from the target particle size, the drive speed of at least one of the rolls is dynamically adapted until no deviation between the detected the particle size and the target particle size is measured. The particle size of the finer chocolate mass can e.g. be measured by means of a near-infrared sensor device of the measuring system. The particle size of the finer chocolate mass can e.g. be measured based on the fat content of the finer chocolate mass measured by the near-infrared sensor device. The drive speed of the second roll can, for example, be dynamically adapted until no or a target deviation between the detected the particle size and the target particle size is measured. The finer further can, for example, comprise means for providing non-continuous control cycles, measuring particle size and mass distribution along at least one of the rolls of the finer, and in case of triggering a deviation from the target particle size and/or the target mass distribution, the drive speed of at least one of the rolls is dynamically adapted until no deviation between the detected the particle size and the target particle size and/or the measured mass distribution and the target mass distribution is measured. The finer can, for example, further comprise means for providing non-continuous control cycles, measuring particle size and mass distribution along the fifth roll of the finer. This embodiment variant has inter alia the additional advantage, that the system allows a continuous control of particle size of the refiner chocolate mass, thus, providing highest reliability in terms of particle size and particle size distribution at all times and along the whole fifth roll (in combination with particle size control). In addition, it allows reducing rework and waste (raw material savings), and it allows to be operated without the need of highly skilled people, as the prior art system require. The discussed, sophisticated optical, real-time, non-invasive, inline measuring system is installed at the five-roll refiner. This system in combinations with the appropriate control algorithms allows determining the particle size and to compare it to a target particle size. If deviations are detected, the speed of the second roll can automatically be adjusted to guarantee an immediate achievement of the particle size. In combination with the ensured even coverage of the 5th roll by the embodiment variant above, it means that a constant quality at the end of the 5-roll refiner can be provided which also optimizes the downstream processes of the production line. The even coverage enables that the particle size measurements can be accurately done and that the particle size distribution is constant, hence less production of fines and better conching conditions. It is to be noted, that a combination of the last two embodiment variants produces a more holistic quality control of particle size compared to one of the embodiment variants alone. A non-continuous control cycles can, for example, be taken over by the system, as sensor-actor-control system. Thus, the system is able to actively and accurately control particle size and mass distribution along the 5th roll.

In a further embodiment variant, the self-optimizing, adaptive inter-machine control system comprises a controller device, wherein the controller device of the self-optimizing, adaptive inter-machine control system captures and monitors the measuring data of the real-time measuring system of the pre-refiner, the measuring data of the real-time measuring system of the finer and the measuring data of the real-time measuring system of the finer, wherein the dynamic adjustment of the pressure and/or roller distance (gap) settings of the two roll pre-refiner based on the measuring data of the real-time measuring system of the pre-refiner and the dynamic adjustment of the roll temperature and/or the roll pressure based on the measuring data of the real-time measuring system of the finer and the drive speed of the second roll based on the measuring data of the real-time measuring system of the finer are mutually optimized and adjusted by means of the controller device. The dynamic adjustment of the roll temperature and/or the roll pressure of the pre-refiner controlling the plasticity can, for example, be further based on the measured drive speed of the second roll controlling the particle size and the throughput of the finer, and wherein the dynamic adjustment of the roll temperature and/or the roll pressure of at least one of the rolls of the finer is further based on the measured drive speed of the second roll controlling the particle size distribution by means of the controller device. This embodiment variant has, inter alia, the advantage, that the refining process (pre-refining and 5-roll refining) is running self-optimizing without human intervention. The embodiment variant allows to merge the benefits of the previous embodiment variants, i.e. capacity boost by continuous controlling of the particle size by means of vertical pattern detecting, total particle size and particle distribution control along the fifth roll of the finer and plasticity control correlating a measured topography with the measured motor power consumption of at least one of the rolls of the pre-refiner. The inventive system further allows to avoid unexpected downtime due to raw material quality fluctuations and hence plasticity problems. In addition, the system allows an overall optimization of the process and process control for complete refining process. The installation of the inline, real-time measuring and control systems on the two-roll pre-refiner and the five-roll refiner allows a new way of optimization of the single process steps. E.g. if plasticity is not coming ideally from the two-roll pre-refiner the system can automatically adjust the five-roll refiner operating parameters to a certain extent. However, if plasticity is strongly out of range, also the five-roll refiner parameters cannot compensate for it. There the system automatically adjusts the plasticity amending exclusively or in combination with the parameters of the refiner the operational parameters of the pre-refiner and/or the mixer and/or the added ingredients by amending the operational parameters of the dosing means. Through the inter-machine communication between the five-roll refiner and the two-roll pre-refiner, by means of the controller device, manual adjustment step or even downtime can be prevented by self-regulating and self-adapting the plasticity according to the needs of the five-roll refiner by means of the controller device. Effectively, the five-roll refiner sends the speed parameters of the second roll over the controller device to the two-roll pre-refiner so the two-roll pre-refiner or the controller device know that they had to change speed in order to reach the right particle size and can react on that by adjusting the plasticity.

In an even other embodiment variant, the finer is realized as a 5 roll refiner comprising a removal knife at the rolls, in particular the final fifth roll of the refiner, wherein the finer comprises an optical, inline, real-time measuring system detecting pattern of a roll coverage of the fifth rolls of the finer with finer chocolate mass, wherein by means of pattern recognition the detected pattern are compared to stored sample pattern a pattern database, wherein in case of triggering error pattern indicative for a worn removal knife by means of pattern recognition of deterioration detecting means, the inline, real-time measuring and control system is adapted to generate a output signaling indicating or initiating a replacement of the removal knife of the fifth roll. The finer can, for example, comprise an inline, non-invasive, real-time measuring system detecting pattern of a roll coverage of at least one of the rolls of the finer with finer chocolate mass, wherein by means of pattern recognition the detected pattern are compared to stored sample pattern of the pattern database, wherein in case of triggering specific first error pattern, at least the roll temperature and/or the roll pressure are dynamically adapted by the self-optimizing, adaptive inter-machine control system providing a continuous control of the particle size distribution of finer mass and an dynamically optimized throughput of the finer, and wherein in case of triggering error pattern indicative for a worn removal knife by means of pattern recognition of deterioration detecting means, the inline, real-time measuring and control system is adapted to generate an output signaling indicating or initiating a replacement of the removal knife of the fifth roll. This embodiment variant has inter alia the advantage, that the system 1 automatically and autonomously detects knife wear to be replaced based on the measured optical data at the fifth roll. If the operational parameters of the refiner are correctly adjusted, the representation of the measured optical data show an ideal film. The result is full coverage. However, a machining state of the refiner wherein the rolls are too cold, leads to a striped pattern, e.g. over the entire length of the roll. These stripes correspond optically measured data, which were interpreted to as an error in the film surface. Such pattern can e.g. occur, if the rolls are over pressed. In contrast, error pattern, indicative for a worn removal knife, are characterized by a combination of stripes and error portions at the side of the roll. It has to be noted that although the image of the surface on the roll is taken before the mass is removed from the roll by the removal knife, a worn removal knife will lead to an incomplete removal, i.e. material will remain on the roll, which in turn leads to characteristic patterns. The measured optical data or line image can, for example, be taken with a CDD-line camera, and be input to image processing means comprising the pattern recognition portion. The pattern recognition portion recognizes or identifies respective patterns, and the control signals are output on the basis of said recognized pattern.

In an embodiment variant, the conche further comprises an inline, non-invasive, real-time measuring and control system with a positioning encoder or sensor, wherein an elevation profile of the conching chocolate mass along a measurement line of a working area is generated conducting position measurement by the positioning encoder or sensor along said measurement line, wherein based on the measured elevation profile parameter values of conching chocolate mass are measured, and wherein in case of triggering a deviation of a measured parameter value of a target parameter value, at least one of the operational parameters of the conche is dynamically adapted by the control and monitoring system aligning the measured parameter values with the target parameter values. The positioning encoder or sensor can, for example, be an optical or electro-magnetic or acoustical positioning encoder or sensor. The measured parameter value of conching chocolate mass can e.g. provide a measure of the consistency of the conche mass for the system. The measurement line of the elevation profile of the conching chocolate mass can, for example, be along the length of the conche vessels and/or the length of the inner surface of conche vessel, and wherein the inner surface of conche vessel provides the working area. The embodiment variant has, inter alia, the advantage, that it allows an adaptive, self-optimizing operation of the conche and the conching process. Further, it allows to reduce the typically time- and energy-consuming conching process in terms of used time and energy. The dynamic adjustment and adaption of the operation parameters allow to provide a fully automated conching process at a new level of efficiency, which is not possible by human operators or manual interaction.

In another embodiment variant, the control and monitoring system of the conche further comprises a fat dosing measuring device measuring the fat weight of the feed material providing the fat content of conche mass, wherein the initial fat content of the basic chocolate mass is dynamically adapted by the dosing means in case of triggering a deviation of the measured fat content of conche mass to a target fat content of conche mass and/or the fat content of conche mass is dynamically adapted by amending the roller characteristics of the refiner. The embodiment variant has, inter alia, the advantage, that it allows to overcome the deficiencies of manual adjustment of the operating parameters of the chocolate production line in order to achieve a desired target fat content of the end product chocolate mass. In prior art, this has to be done by an operator based on his empirical know-how and operating experience. In addition, the fat contribution of the fat containing ingredients is typically conducted by the dosing means and the mixer, and not in the conching device. Thus, there are many reasons for deviations of the effective fat content of the end product from the target fat content of the receipt, as e.g. faulty dosage (in particular there are typically up to six mixer batches for a conching process), or manual adaption of the operating or dosing parameters by the operator in order to achieve a preferred plasticity. The inventive system allows to overcome the deficiencies of manual adjustment of the operating parameters of the chocolate production line based on its adaptive, self-optimizing inter-machine optimization of the operating parameters between the conche and the mixer-dosing means by means of the controller and steering device of the adaptive system.

In another embodiment variant, a controller device of the self-optimizing, adaptive inter-machine control system captures and monitors the measuring data of the real-time measuring system of the pre-refiner and/or the measuring data of the real-time measuring system of the finer and/or the measuring data of the real-time measuring system of the finer, and/or the measuring data of the fat content measuring device of the conche, wherein the dynamic adjustment of the pressure and/or roller distance (gap) settings of the two roll pre-refiner based on the measuring data of the real-time measuring system of the pre-refiner and the dynamic adjustment of the roll temperature and/or the roll pressure based on the measuring data of the real-time measuring system of the finer and the drive speed of the second roll based on the measuring data of the real-time measuring system of the finer and the dynamic adjustment of the initial fat content of the basic chocolate mass by the dosing means, are mutually optimized and adjusted as operational parameters by means of the controller device, and wherein in case of having optimally adjusted said operational parameters and in case of trigging a deviation of a measured throughput to a predicted throughput of the chocolate mass under optimally adjusted said operational parameters, a wear of rolls of the finer or the rolls of the pre-refiner is measured and monitored and an output signaling indicating or initiating replacement and/or optimal time of replacement of the appropriate roll is generated. This embodiment variant has inter alia the advantage, that the system automatically and autonomously detects wear of rolls to be replaced.

Finally, in another embodiment variant, the self-optimization and adaption is covering the whole production line, by the self-optimizing, adaptive inter-machine control system, wherein a controller device of the self-optimizing, adaptive inter-machine control system captures and monitors the measuring data of the real-time measuring system of the pre-refiner and/or the measuring data of the real-time measuring system of the finer and/or the measuring data of the real-time measuring system of the finer and/or the measuring data of the fat content measuring device of the conche, wherein the dynamic adjustment of the pressure and/or roller distance (gap) settings of the two roll pre-refiner based on the measuring data of the real-time measuring system of the pre-refiner and/or the dynamic adjustment of the roll temperature and/or the roll pressure based on the measuring data of the real-time measuring system of the finer and/or the dynamical adjustment of the drive speed of the second roll based on the measuring data of the real-time measuring system of the finer and/or the dynamic adjustment of the initial fat content of the basic chocolate mass by the dosing means, are mutually optimized and adjusted as operational parameters by means of the controller device. This embodiment variant has, inter alia, the advantage, that the system is enabled to measure appropriate inter-dependent operational parameters of the various devices in real-time by real-time measuring devices and to transmit them to a central machine-to-machine controller device. The measured inter-dependent operational parameters can be mutually optimized and dynamically adjusted providing an optimal operation at least in terms of the characteristics of the end chocolate mass and/or throughput of the chocolate production line and/or other operation conditions as energy consumption.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
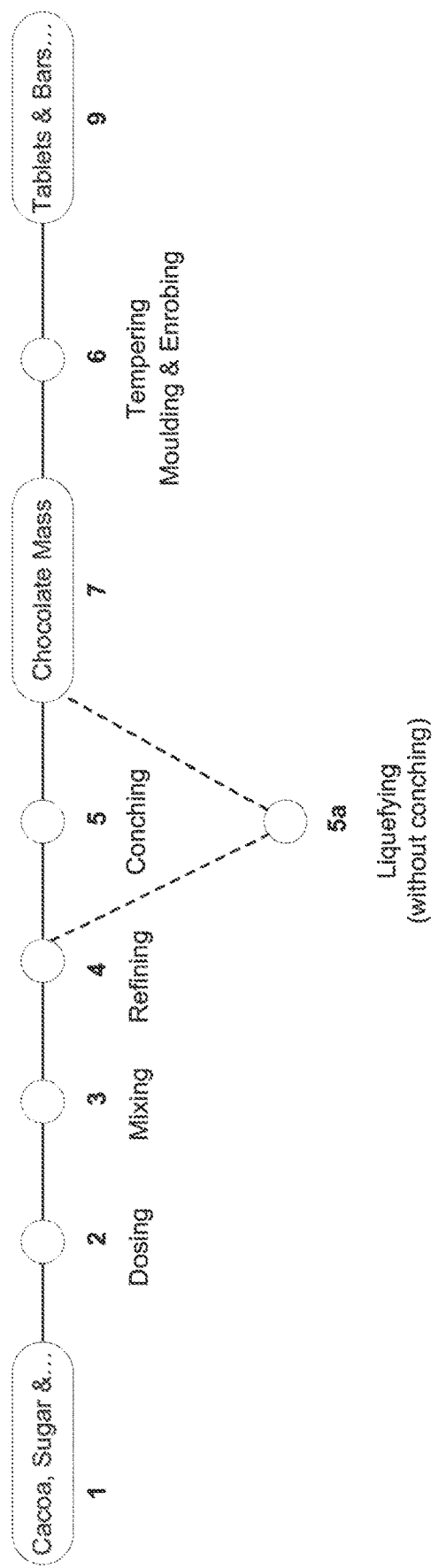
FIG. 1 shows a block diagram schematically illustrating a chocolate mass processing line 11 with at least dosing means 2, one or more mixers 3, one or more refiners 4, one or more conches 5, and liquefying and tempering means 6. Solid and/or liquid feed materials 24 are precisely dosed, conveyed and discharged to the one or more mixers 3 by the dosing means 2. The feed materials 24 are mixed and/or kneaded to a basic chocolate mass 35 with a defined plasticity 351 and homogeneity 352 by the one or more mixers 3 and transferred to the one or more refiners 4 comprising pre-refiners 41 and finers 42. The basic chocolate mass 35 is pre-processed to a chocolate mass 411 with a predefinable plasticity 4112 and fineness 4113 by at least two pre-refiner's rollers 412 having a controlled roller pressure 4121 and/or roller gab/distance 4126, and speed 4122, and processed to a chocolate mass 421 with a predefinable fineness 4212 of the dry powder by a plurality of finer rollers 422 having a controlled roller pressure 4221 and/or distance 4226 and speed 4222, and transferred to the one or more conches 5 or one or more liquefyor 5a. The refiner chocolate mass 421 is processed to a conching chocolate mass 51 with a predefined moisture 511, viscosity 512, texture 514 and fat content 516 by the one or more conches 5 and transferred to the tempering means 6, each of the conches 5 at least comprising a container or conche vessel 54 having an inner surface 542 and at least one moveable shaft or rotatable rotor 555 situated inside said conche vessel 54, wherein shearing elements 554 extend from said shaft 55 towards said inner surface 542 pressing the conching chocolate mass 51 against the vessel surface 542 during operation and/or between overlapping shearing elements 554. The chocolate mass 51 is processed to the chocolate mass 61 with a predefined moisture 61, degree of crystallization 612, and fat content 617 by adding cocoa butter 6211 and/or other fats 6212 by the liquefying means 62 and by varying temperature 615 by the tempering means 64 to achieving the predefined degree of crystallization 612 measured by a temper meter 641 and outputted as end product 7.
Figure 2:
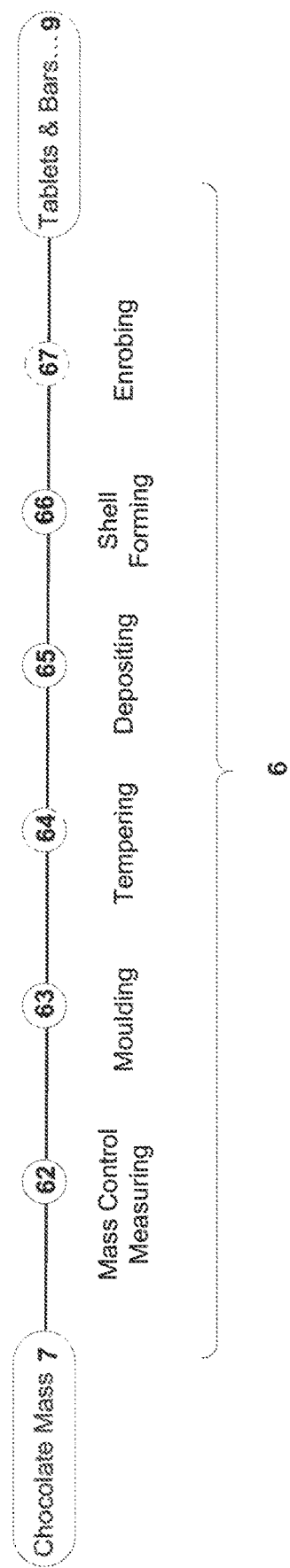
FIG. 2 illustrating exemplary the tempering 6 of the chocolate mass processing line 11, comprising control measuring 62, moulding 63, tempering 64, depositing 65, shell forming 66 and enrobing 67.
Figure 3:
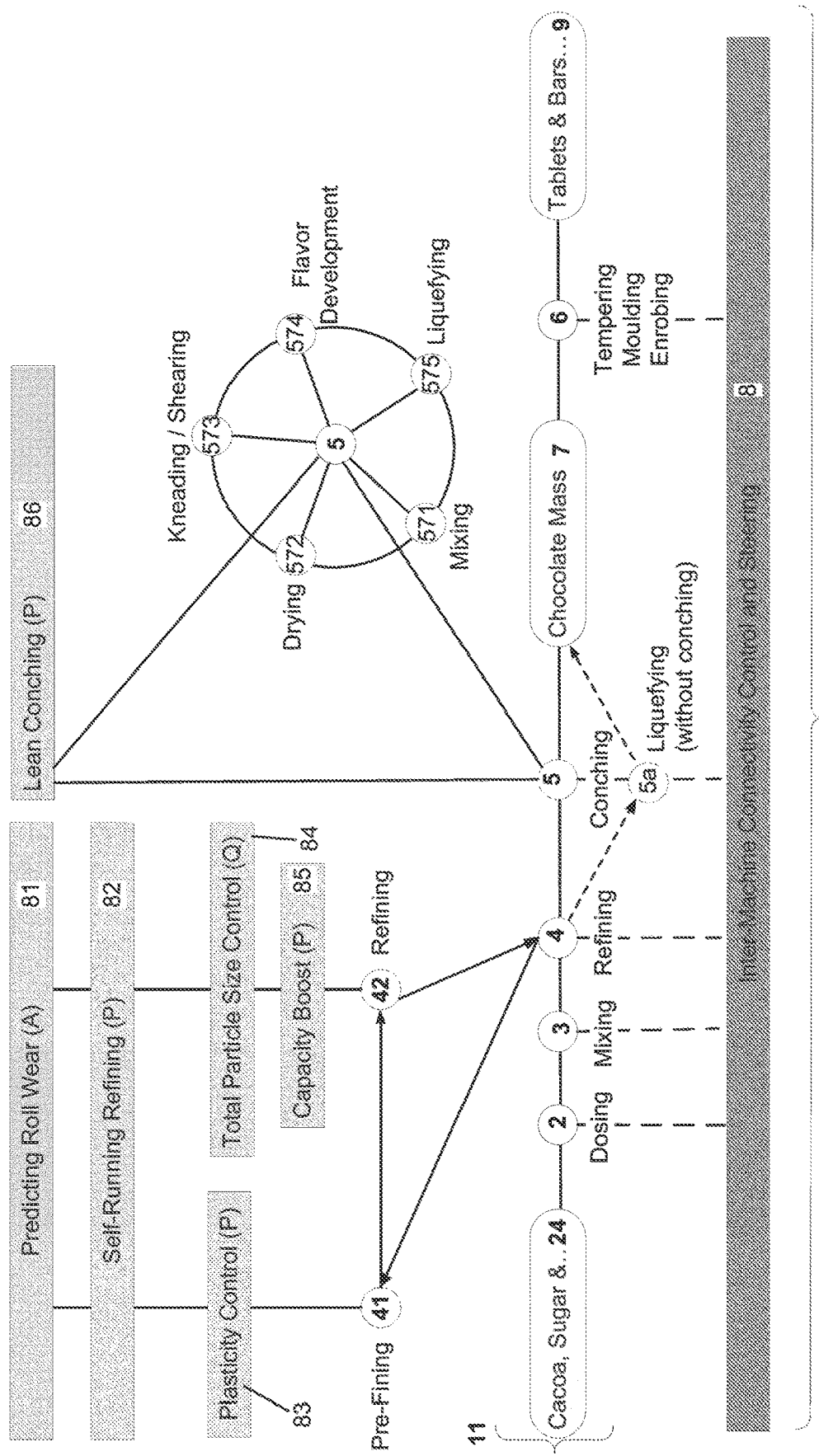
FIG. 3 shows schematically an exemplary a self-optimizing, adaptive inter-machine control system 1 reacting, in real-time, dynamically on captured operational, environmental or initial feed product parameters of industrial chocolate production lines 11 during operation. A controller device 12 of the self-optimizing, adaptive machine-to-machine control system 1 captures and monitors the measuring data 4153 of the real-time measuring system 415 of the pre-refiner 41 (plasticity control 83) and/or the measuring data 4266 of the real-time measuring system 426 of the finer 42 (capacity boost 85) and/or the measuring data 4273 of the real-time measuring system 427 of the finer 42 (total particle size control 84) and/or the measuring data 5291 of the fat content measuring device 529 of the conche 5 (lean conching 86). The dynamic adjustment of the pressure 4121 and/or roller distance (gap) settings 4134 of the two roll pre-refiner 41 based on the measuring data 4153 of the real-time measuring system 415 of the pre-refiner 41 and/or the dynamic adjustment of the roll temperature 4227 and/or the roll pressure 4221 based on the measuring data 4266 of the real-time measuring system 426 of the finer 42 and/or the dynamical adjustment of the drive speed 4222 of the second roll 422 based on the measuring data 4273 of the real-time measuring system 427 of the finer 42 and/or the dynamic adjustment of the initial fat content 355 of the basic chocolate mass 35 by the dosing means 3, are mutually optimized and adjusted as operational parameters (predicting roll wear 81/self-running refining 82/plasticity control 83/total particle size control 84/capacity boost 85/lean conching 85) by means of the inter-machine connectivity control and steering 8 of the controller device 12.
Figure 4:
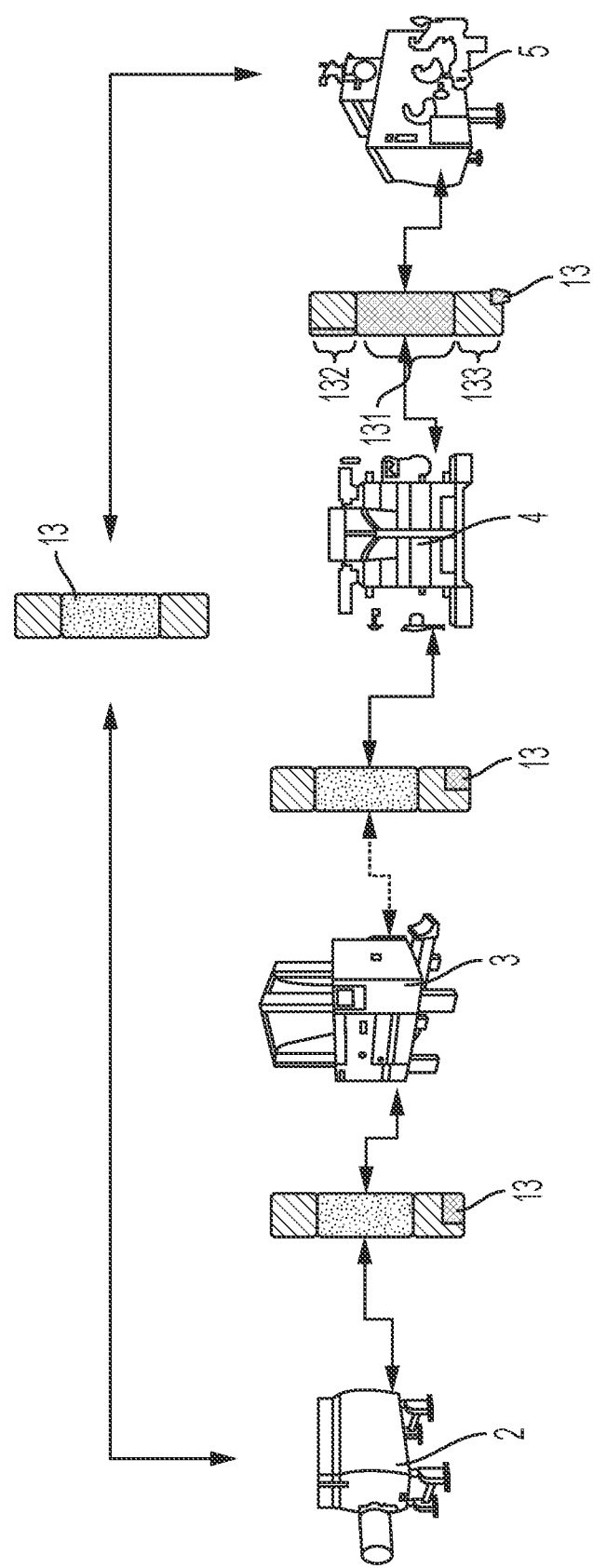
FIG. 4 shows schematically an exemplary another self-optimizing, adaptive machine-to-machine control system 1 reacting, in real-time, dynamically on captured operational, environmental or initial feed product parameters of industrial chocolate production lines 11 during operation. The adaptive machine-to-machine control system 1 allows working at the highest possible efficiency, for example, by measuring the efficiency of the chocolate production and manufacturing operation as a rate of the overall equipment effectiveness (OEE). Though, the OEE typically is not an absolute measure, the OEE is very well suited to identify a production line specific scope for process performance improvement (see machine interacting range column monitoring). Thus, the self-optimizing, adaptive machine-to-machine control system 1 allows to minimize the operational cost and used resources, as energy consumption, labor or production time.
Figure 5:
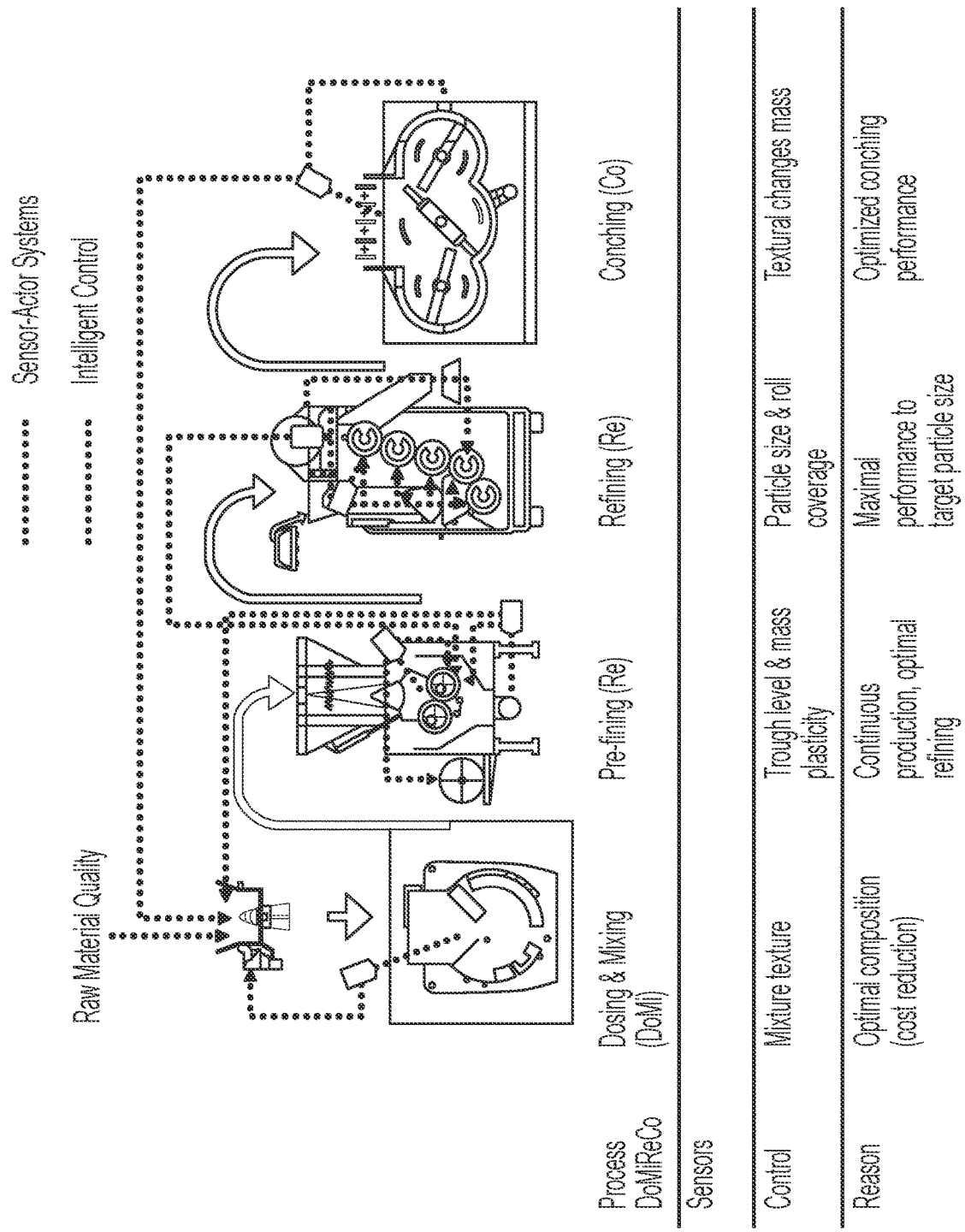
FIG. 5 shows schematically an exemplary another self-optimizing, adaptive machine-to-machine control system 1 reacting, in real-time, dynamically on captured operational, environmental or initial feed product parameters of industrial chocolate production lines 11 during operation. In particular, the machine-to-machine interaction is shown by means of the intelligent, optimized steering of the controller device 12 of the sensor-actor system 1, i.e. the self-optimizing, adaptive machine-to-machine control system 1, acting overall optimized on the dosing means 2, mixer 3, pre-finer 41, refiner 42 and conching 5, and if needed on the liquefying means 6.

FIG. 1 schematically illustrates an architecture for a possible implementation of an embodiment of the DoMiReCo process (Dosing, Mixing, Refining, Conching) underlying the self-optimizing industrial chocolate production system 1 and process. FIG. 2 shows the tempering 6 of the chocolate mass processing line 11 from the chocolate mass 7 to the end product 9. FIG. 3 schematically illustrates an architecture for a possible implementation of an embodiment of the self-optimizing industrial chocolate production system and process 1. For the present invention, "self-optimizing" means the development of self-optimization means, as an important control technology in adaptive, technical systems. The technical extension of classical control techniques and principles to include autonomous goal redefinition makes it possible to establish intelligence in technical systems. In conjunction with the availability of real time measuring information, and other emerging technologies as complex sensing environments and sensors, connectivity and data analytics, this paves the way for the creation of robust and at the same time flexible production systems even in highly dynamic industry environments. The present system 1 is based on an industrial chocolate production process lines 11 comprising at least dosing 2, mixing 3, refining 4, and conching 5 (also referred as DoMiReCo process), which is the todays most widely used process in chocolate production. The refining system 4 can e.g. comprise a two-stage refining process made up of a pre-refiner 41 and a five-roll refiner 42, constituting a central part of the DoMiReCo process for processing chocolate masses 7 as end products. In general, the present system 1 and process line should be able to optimally cover the processing chain from proportioning and mixing 3 to refining 4 and conching 5. If a five-roll refiner 42 is used, the five-roll refiner, preferable realized as fully automatic device, should allowing a wide variety of product recipes to be produced in the required plasticity and fineness. The refined chocolate, filling and coating masses should preferable exhibit an extremely narrow particle size distribution, but may at the same time be homogenized and flavored during size reduction. The conching 5, as final refinement, can be performed using various conche types. Optimal values in terms of texture, melting characteristics, flavor, and final moisture should be achievable. In optimal operation, the industrial chocolate production system 1 and process at least based on Dosing-Mixing-Refining-Conching process should result in a markedly fine and perfectly compound chocolate product 7.

The chocolate production line 11 consists, apart from the dosing means 2, of one or more mixers 3, one or more 2-roll-pre-refiners 41 and 5-roll-refiners 42 and one or more conches 5. In the mixer 3 the largest part of the recipe is blended, although some fat is left out, as otherwise the mix would be too fluid for the refiners 4. The 2-roll-refiner 41 crushes sugar crystals e.g. to sizes below 100 μm. Alternatively, sugar can be ground separately by a sugar mill, which was common practice in earlier systems. Although sometimes this set-up can still be found, most production lines have preferably the 2-roll-refiner 41 due to the danger of dust explosions in sugar mills. The following 5-roll-refiner 42 is a sophisticated machine, usually difficult to operate, but essential for final product 7 quality. The feed mass 24 must have a certain consistency, which is determined by the initial fat content 2412, particle properties 241 and upstream process parameters 242. In this process step, the particles are ground to their final size, usually below 30 μm in order to avoid a sandy texture in the mouth in the final product 7. Another, often occurring difficulty, in this context, is to combine continuous refiners 4 with downstream batch conches 5. Productivity of both machines 4/5 strongly decreases if only one refiner 4 is connected to one conche 5. Therefore, usually a number of refiners 4 are connected to a number of conches 5, which leads to relatively large production lines of typically around several tons per hour. As described above, the conche 5 is a large kneader, where the powdery flakes from the refiners 4 are treated with a large amount of mechanical energy input, usually over several hours. This is where most of the transformations described above takes place. During the process the remaining fat and emulsifier are added. Conches 5 are built in various forms and can be equipped with one, two or three mixing shafts. In order to meet the needs of smaller production lines 11, as e.g. lines with capacities of 300-600 kg/h, the 2+5-roll-refiners can also be replaced by two three-rollers or other suitable combinations.

Thus, as described above, the self-optimizing, adaptive industrial chocolate production system 1 comprises a chocolate mass processing line 11 with at least dosing means 2, one or more mixers 3, one or more refiners 4, one or more conches 5 or one or more liquefyors 5a, and tempering means 6. Solid and/or liquid feed materials 24 are precisely dosed, conveyed and discharged to the one or more mixers 3 by the dosing means 2. The feed materials 24 are then mixed and/or kneaded to a basic chocolate mass 35 with a defined plasticity 351 and homogeneity 352 by the one or more mixers 3 and transferred to the one or more refiners 4 comprising pre-refiners 41 and finers 42. The basic chocolate mass 35 is pre-processed to a chocolate mass 411 with a predefinable viscosity 4111, plasticity 4112, and fineness 4113 by at least two pre-refiner's rollers 412 having a controlled roller pressure 4121, speed 4122 and distance 4126, and then processed to a chocolate mass 421 with a predefinable viscosity 4131, plasticity 4211, and fineness 4212 by a plurality of finer rollers 422 having a controlled roller pressure 4221, speed 4222 and distance 4226. The chocolate mass 421 is transferred to the one or more conches 5. The refiner chocolate mass 421 is processed to a conching chocolate mass 51 with a predefined moisture 511, viscosity 512, texture 514 and fat content 516 by the one or more conches 5 and transferred to the liquefying and tempering means 6. Each of the conches 5 at least comprise a container or conche vessel 54 having an inner surface 542 and at least one moveable shaft or rotatable rotor 555 situated inside said conche vessel 54 extending from said shaft 555 towards said inner surface 542 and pressing the chocolate mass 51 against the vessel 54 surface 542 during operation. Finally, the chocolate mass 51 is processed to the chocolate mass 61 with a predefined moisture 61, degree of crystallization 612, and fat content 617 by adding cocoa butter 6211 and/or other fats 6212 by the liquefying means 62 and by varying temperature 615 by the tempering means 64 to achieving the predefined degree of crystallization 612 measured by a temper meter 641, Viscosity, as also used herein, is a measuring parameter of flow measurements of fluids, such as liquids, semi-solids, gases and even solids. Viscosity can be defined as the internal friction of a fluid, caused by molecular attraction, which makes it resist a tendency to flow. Viscosity measurements can be made in conjunction with product quality and efficiency. Typically, quality control or fluid transfer necessarily need some type of viscosity measurement. In prior art, there exist various types of viscometers, and accordingly, various techniques for measuring viscosity are known, each suitable to specific circumstances and materials. In chocolate production, one reason for the measurement of rheological properties are quality control, where the materials, in particular the raw materials 24, preferably are consistent from batch to batch. For this purpose, flow behavior can be an indirect measure of product consistency and quality of the processing chocolate mass. Another reason for making flow behavior measurements is that a direct assessment of processability can be obtained. For example, a high viscosity liquid can require more or less power to process than a low viscosity one. Knowing its rheological behavior, therefore, is useful when designing and controlling the production line devices. In chocolate mass production rheology is one of the most sensitive methods for material characterization because flow behavior is responsive to properties such as molecular weight and molecular weight distribution. In the present system 1, viscosity measurements are, inter alia, employed as a quality check during production, for monitoring and/or controlling the process within the production line 11. As mentioned, viscosity, herein, is the measure of the internal friction of the chocolate mass as a fluid. In a fluid, the friction becomes apparent when a layer of fluid is made to move in relation to another layer. The greater the friction, the greater the amount of force required to cause this movement, which is called shear. Shearing occurs whenever the fluid is physically moved or distributed, as in pouring, spreading, spraying, mixing, etc. Highly viscous fluids, therefore, require more force to move than less viscous materials. Plasticity, as used herein, is another measure of the chocolate mass during its processing within the production line 11. Semi-solid food fats, as chocolate mass, consist of discrete crystalline particles embedded in a considerable proportion of the liquid fat chocolate mass. There is some loose adhesion between the crystals which breaks down rapidly when the fat is subject to working and a shearing stress is applied. This is referred herein as plasticity. Important factors in the context of measuring plasticity are (i) content of solids, (ii) size and shape of crystals, (iii) persistence of crystal nuclei under changing temperature, (iv) mechanical working of the fats etc. Further, the texture of the chocolate mass is governed by the measured plasticity. The quality, which is in chocolate production also referred as "tenderness" is essentially dependent upon the measured plasticity. The maximum attainable degree of tenderness is often an important attribute for the best chocolate quality. Loss of moisture decreases plasticity. Thus, quantitative measurements of plasticity can be used for control of quality, in particular in large scale chocolate production lines 11. Plasticity can be measured in different ways. For example, the consistency of the fat at different temperatures can be measured, e.g. using a penetrometer, such as a Humboldt penetrometer. Plasticity measurement can also be used for controlling the effectiveness of tempering in solid chocolate mass based upon measurements with a sensitive penetrometer. Other measurements can also be used to measure its surface hardness etc. Characteristics and quality of liquid chocolate mass critically depend upon viscosity, while the texture of the solidified chocolate mass is also governed by plasticity. However, the two properties are related. Specifications for different grades of the chocolate mass during the controlling of the production cycle 11 can include the viscosity of the liquid chocolate mass determined at temperatures somewhat above its melting point, e.g. by a viscosimeter.

Appropriate discharge, conveyance and storage is important for the process of chocolate mass production. Efficient and accurate dosing 2 ensures high throughput and reproducible quality. Core to chocolate processing systems 1 is the production of the chocolate recipes. The ingredients 24 are carefully mixed by a mixer 3, with the high shear and kneading action producing homogeneous 352 and plastic 351 masses 35 for further processing. For the dosing process 2, the system 1 can comprise appropriate discharging means 21 (discharger), as vibro-dischargers 211, and/or feeding means, as e.g. appropriate vibroprocess vibrating feeders 221, vibrating dosing feeders 222, and conveying means 23 (conveyor) as screw conveyors 231 or tubular screw conveyors 232. Vibrating feeders 221 and vibrating dosing feeders 222 are used for extracting the needed bulky feed products 24 from silos or bins or for feeding crushers, conveyor belts etc. However, the above-mentioned feeding and conveying systems 22/23 can easily replace other extraction systems 22/23 such as box extractors, scraping belts, screw feeders, etc. giving alternative benefits as they can e.g. be easily installed and require minimum maintenance. Possible vibrating feeders 221 for the system 1 are typically classified in three major categories, based on the principle of operation: (i) Electromechanical vibrating feeders 2211: These feeders are driven by counter-rotating electric vibrators, mounted on the cross beam of the electromechanical vibrating feeder. The unbalance motors generate a linear vibration, inducing the motion and the transport of the handled material. The electromechanical vibrating feeders should be used only when flow rate variations with the machine running are not required, nor an immediate stop of the flow of extracted product. This work condition can be achieved by controlling the electric vibrators via inverter (frequency converter); (ii) Electromagnetic vibrating feeders 2212: These feeders are driven by electromagnetic vibrators, mounted on the cross beam of the vibrating structure. The electromagnetic drive generates a linear vibration, inducing the motion and the transport direction to the handled material. The electromagnetic vibrating feeders should be used when it is needed to change the flow while the machine is running and/or immediately stop the product flow as soon as the machine is stopped. The electromagnetic vibrating feeders are also referred as vibrating dosing feeders thanks to their versatility in changing the flow based on the requirements of both the plant and the process; (iii) Mechanical vibrating feeders 2213: These feeders are driven by an electric motor with direct transmission through a cardan shaft that moves the directional exciter mounted on the cross beam of the vibrating structure. The directional exciters generate a linear vibration, inducing the motion and the transport direction of the handled material. The mechanical vibrating feeders can e.g. be used for machines with large weight and size. The chosen solution can e.g. also depend on other factors such as the number of hours of operation per day, the temperature 2413 of the material 24 to be processed, and the size 2414 of the material to be processed. The electric motors of the mechanical vibrating feeders can also be connected to a frequency converter in order to achieve the benefits already mentioned above. All vibroprocess vibrating feeders 221 may typically be designed according to the product to be processed, i.e. in the present invention for the input or feed material 24 to the chocolate processing system 1. The size 2422 of the dosing machines 2 can be evaluated and optimized taking into consideration several essential process parameters 242 such as the amount 2421 of material 24 to be extracted, while other design details are related to factors such as temperature 2413, weight and particle size of the feed material 24. The vibroprocess vibrating feeders 221 can e.g. at least be optimized concerning (i) the used anti-wear liners, as e.g. steel or anti-wear steel liners, rubber sheet lining, sheet with welded lining; (ii) the used suspension and isolation methods, which are the methods of vibrating feeders suspension refers to the various methods by which the vibrating screens can be anchored to the static structures of the machine, as e.g. suspended execution, self-suspended execution, and supported execution; (iii) the used isolating methods: Vibrating Feeders 221 vibrations are isolated by two different types of springs. The spring type may be chosen based on the type of drive, for example, as electromechanical vibrating feeders, i.e. coil steel springs, mechanical vibrating feeders, i.e. rubber dampers, or electromagnetic vibrating screens, i.e. rubber dampers; (iv) the required material 24 discharge: Material unloading can be adapted to the most diverse customer plant requests and ad-hoc studied from case to case. The two most common methods used are front discharge and orthogonal discharge.

Further, the conveyor means 23, as e.g. screw conveyors 231, in particular tubular screw conveyors 232, can be used for accurate blending and mixing, which is a basic requirement for making high-quality products 7 in the chocolate industries production lines 11. In general, a screw conveyor 231 is a device that uses a rotating helical screwblade, usually within a tube, to move liquid 24111 or granular 24112 materials 2411. Screw conveyors 231 can be used horizontally or at a slight incline as an efficient way to move semi-solid materials, including food waste, wood chips, aggregates, cereal grains, animal feed, etc. A tubular screw conveyor 232 may be a preferred solution for accurate feeding of individual ingredients 24 to the mixers 3 or possible weigh hoppers. Turbular screw conveyor 232 is typically excellently suited to conveying materials in applications which must meet elevated sanitation requirements, as chocolate (food) production does. A specially sanitation-focused design can e.g. be used. For example, a completely enclosed housing can allow flexible application even if demanding requirements must be satisfied. In general, the dosing means 2 should allow for creating and modifying a variety of recipes, with parameters for all technology machines performing their implementation: mixers 3, pre-refiners 41, refiners 42 and specified conches 5 for receipt and conching of the mass. Thus, the dosing means 2 should at least allow for selecting, launching and executing a specific recipe based on the appropriate dosing 2 of the feeding material 24, preferably with high speed and precise dosing of the dry 24112 and/or liquid 24111 components 24.

During the production and processing of chocolate as a fatty mass, the components 24 of the mass 7 are, at first, mixed with one another, and the basic chocolate mass 35 becomes homogeneous 352 and plastic 351 during mixing and optionally during kneading. The components of the mass 35 are solid 24112 and/or liquid 24111 constituents 24, i.e. dry constituents 24112, such as cocoa powder, granular crystal sugar or milk powder, liquids 24111 and/or pasty masses. For said mixing process, the system 1, for example, comprise appropriate mixing devices 3, which e.g. can be specifically designed for mixing and shearing chocolate and coating masses 35 of average to high viscosities 353, thereby mixing the ingredients 24 into a homogeneous 352 mass. The mixing device 3 can e.g. comprise a kettle with a driven shaft, wherein tools, in particular mixing, homogenizing, shearing, scraping and/or conveying tools, are arranged on the shaft. More particular, the mixing device 3 can comprise a kettle with an inner wall which at least partially imitates the outer surface of a rotational body. This can, for example, be realized as cylinder jacket. However, the inner wall may also correspond to a conical body, such as a cone. The rotating tools can then brush along a large part of the inner wall of the kettle. The mixing and/or kneading can be carried out in a double cylinder trough with two shafts rotating in an axially parallel manner. The kettle, or the axis of the rotational body, and the shaft can be arranged horizontally. However, the kettle can also be arranged in an inclined manner or vertically such that the mass, assisted by gravity, is driven along the kettle axis. Mixers 3 having substantially horizontally arranged shafts are referred as horizontal mixers. The kettles can e.g. have a feed opening in the upper region for feeding in the mass while a discharge can be arranged at the lowest point of the kettle. In such mixers 3, the mass is driven about the shaft by the tools. In a horizontal mixer 3, the mass is raised by the tools in a rising direction, having arrived at the top is detached from the tool and dropped owing to gravity through the intermediate space between tool and shaft onto the lower part of the inner wall of the kettle, from where the mass is again picked up by the tools. The components of the mass are mixed in the process and the mass is homogenized. Finally, other important characteristics of the mixer 3 can comprise (i) automatic mixing of the components in the mixer 3 by previously set parameters in the recipe parameters, as time, speed, etc., (ii) automatic mass transfer from the mixer 3 to pre-refiner(s) 41.

As a suitable embodiment variant, a mixing device 31, in particular a spiral stirring unit 311 (mixing), a kneader 32 and a shearing machine 33 can be used for mixing, kneading and shearing according the present invention. If the mixer 3 is equipped with a variable-speed-drive 36, the mixer 3 can be used as a kneader 32 when operated in the high-speed mode, providing an efficiently homogenizing 352 of the chocolate mass. Thus, mixer 31 and kneader 32 may be combined in one device 3. If the mixing 31 and shearing 33 action are appropriately optimized, it shortens mixing times and maximizes throughput rates. A high shearing action 33 typically results in maximum release of immobilized fat. The mixing 31 and/or shearing device 33 may e.g. provide a variable drive with a gear and according space conditions for feed of components and access to the mixing trough. High-precision load cells can e.g. enable precise weighing. Energy-efficient and precise temperature control 312 may be provided by a thermostat control with open or closed water circuit, for example, in conjunction with a hot water system dynamically measuring the temperature 354 of the basic chocolate mass 35. Self-discharge at high capacity and good residual discharge can e.g. minimize production leftovers in the process chamber. For the chocolate, compound and fat filling masses, nut pastes as well as rework, the mixer 3, for example, is suited to process a wide variety of masses, as common in the confectionary industry. Further, independent mixing tubs 313 can e.g. allow for frequent recipe changes in the production of small batches and make the chosen solution appropriate flexible for the chocolate processing. The mixer 3 can e.g. be equipped with both an agitator unit 31 and cutter unit 33 for mixing and size reduction and/or a disperser disc 34 for homogenization and liquefying. The speed of an agitator unit 31, e.g. with flexible side and bottom scrapers, can for example be continuously adapted through a variable speed drive. Optimizing processing of all masses for shorter processing times can be a crucial advantage of a mixer 3. Further, the mixer 3 should enable to ensure that the product is perfectly and optimally intermixed. In chocolate production, it may be preferable that small batches with specialties can be easily combined with large-scale chocolate production processes. For that, it can be preferable that the ingredients 24 can be blended in a separate unit following automated instrumental or manual weighing.

For the refining process, the system 1 comprises appropriate refining devices 4 and technology. For example, the refining process can be based on a two-stage refining process 41/42 made up of a two-roll pre-refiner 41 and a five-roll refiner 42 providing the refining 4 within a DoMiReCo (Dosing, Mixing, Refining, Conching) process and processing the chocolate masses in the processing chain 11 from proportioning 2 and mixing 3 to refining 4 and conching 5 (cf. FIG. 1/2). Said (five-roll) refiner 42 can e.g. be fully automated, allowing a wide variety of product recipes to be produced in the required plasticity 4211 and fineness 4212. The refiner device 4 preferable is enabled to provide a refined chocolate and filling/coating mass 411/421 exhibiting an extremely narrow particle size 4214 distribution 4215, but at the same time allowing the chocolate to be homogenized 4215 and flavored during size reduction. The final refinement can be performed using different conche types 5, thus, optimal values in terms of texture, melting characteristics, flavor, and final moisture can be achieved.

The pre-refiner 41 can e.g. be realized as a semi- or fully automated two-roll 412 pre-refiner 41 for small-size, mid-size to large production lines 11. The pre-refiner device 41 can allow for a low to high level of automation, enabling a wide range of chocolate masses, filling and coating masses 411 to be pre-processed, with masses that must have a certain viscosity 4111. The output product 411 of the pre-refiner 41 should achieve a reproducible plasticity 4112 and a definable fineness 4113 ranging, e.g. from 70 to 250 microns, with a narrow particle size distribution 4115. The pre-refiner 41 can e.g. be realized with different roll lengths 4125, as e.g. 900, 1300, and 1800 mm. The pre-refiner 41 can e.g. further allow for a controlled gap setting 4134 for optimal product fineness 4113 during operation. Thus, the fineness 4113 and plasticity 4112 of the product is selectable during ongoing operation. A roller pressure control system 4131 can e.g. allow raw product 24 fluctuations to be balanced, controlling the consistency of the resulting end product 7. Therefore, the roller pressure control system 4131 can also control and improve the performance of the product discharged from the downstream five-roll refiners 42, optimizing the product fineness and the maximal variations of the product 7. The pre-refiner 41 can e.g. provide a flexible roller pressure 4121 with a range, as broad as possible, of possible pressure settings, which may enable a wide variety of products to be processed. The settings can also comprise a flexible roller gap 4126, so that the roller gap 4126 can be adjusted during operation, in particular online, by appropriate adjustment motors. The process zone of the pre-refiner 41 can e.g. be optimized to match to specific product recipes. Customized specification of the roller speeds 4122, roller speed differentials 4123, and roller crown 4124 can e.g. be realized to enable maximum throughputs (e.g. measured in t/h) to be achieved with the required product fineness 4113. Depending on the machine type, the capacity 414 can e.g. be variable adjustable to the performance of the following five roll refiners 42. The high shearing capacity 414 can e.g. be realized to release a maximum amount of the bound fat while at the same time calibrating the crystallized sugar resulting in a homogeneous product and an efficient process. Important additional characteristics of the pre-refiner 41 can comprise (i) Control of the motor 4132, (ii) Control 4135 of the temperatures 4127 of the 2 rollers, (iii) Control of the distance between the rollers 4134, (iv) automatic equal power supply to the refiners 4, included in the recipe execution.

The pre-refiner 41 can comprise an inline, real-time measuring system 415 measuring changes in the consistency 4116 of the pre-fining chocolate mass 411. The pre-finer 41 can e.g. be realized with two rolls 412. However, the pre-finer 41 can also be realized comprising 1 or 3 or more rolls 412. The pressure 4121 and/or roller distance (gap) settings 4134 of the two-roll pre-refiner 41 are automatically adjusted by means of the adaptive inter-machine control system 1 providing an autonomous plasticity control with a predefined plasticity parameter value. The pre-refiner 41 can e.g. be realized as a two-roll refiner 41, with automatically adjustable gap-settings 4134 of the two rolls 412 varying the gap between the rolls 412 upon amending the gap-setting parameters 4134. The inline, real-time measuring system 415 can e.g. comprise at least a light source 4151, an optical image capturing device 4152, and a measuring device 372 for measuring the power consumption 371 of the chocolate mass 35 conveying device 37. A throughput of the pre-fining chocolate mass 411 can e.g. be measured by line triangulation of the light source 4151 and the optical image capturing device 4152. However, the throughput measurement can e.g. also be achieved by simple point-to-point distance sensor or ultra-sonic distance sensor or a weighing counter or scaler of the upstream vessel/container or a measuring device measuring the power consumption at the conveyor motor and/or the rotor of the rolls 412 of the pre-finer 41. The plasticity 4112 of the pre-fining chocolate mass 411 can e.g. be dynamically controlled based on a constant throughput in combination with the measured power consumption 371 of the chocolate mass 35 conveying device 37. A topography of the chocolate mass 411 can e.g. be assessed in the inlet zone of the rolls 412 of the pre-refiner 41 by the line triangulation based on the fan shape of the centrally projected laser or light source 4151 lines. The throughput of the chocolate mass 411 is dynamically measured based on the detected topography lines. The pressure 4121 and/or roller distance (gap) settings 4134 of the two-roll pre-refiner 41 can e.g. be automatically adjusted by means of the adaptive inter-machine or machine-to-machine control system 1 to provide a predefined value of plasticity by keeping a constant throughput of the chocolate mass 411 in combination with the measured power consumption of the conveying device 37. The light source 4151 can e.g. be realized as a laser or multiline laser or LED projectors and/or the optical image capturing device 4152 is realized as a camera or a multiline laser measuring sensor or triangulation sensor. The system 1 provides a fully automated and autonomous plasticity control of the pre-refiner chocolate mass 412. The real-time, non-invasive, inline measuring and control system 415 is able to detect changes in the consistency of the pre-refined mass 421 and adjusts the pressure 4121 and/or gap setting 4126 and/or roller speed 4122 of the two-roll pre-refiner 41 automatically. The real-time, non-invasive, inline measuring and control system 415 can e.g. be composed of a laser 4151/camera 4152 in combination with the evaluation and correlation of the motor power. The laser 4151 allows to assess the topography of the mass in the inlet zones of the two-roll pre-refiner 41. The camera 4151 can detect these topography lines and hence allows the constant measurement of the throughput. However, any other measurement of the throughput can be used, as e.g. energy consumption at the motor of the conveyor device, or the power consumption of the motor of the rolls 412. This constant throughput in combination with the measurement of the motor power of the conveying screw, allows an automated and accurate plasticity 4112 control and adaption. In contrast to this, in prior art systems, the operators had to regularly check and guarantee the mass plasticity and hence performance of the line. The automated and active control by means of the system 1 allows achieving constant, target plasticity 4112 after the pre-refiner 41, thereby increasing productivity of the refiner 42 (e.g. up to 3% capacity allowing a faster conche filling). Further, the system 1 allows for reducing needed labor in terms of manual adaptation and cleaning efforts due to overfilling.

The finer 42 can e.g. be provided for processing a large diversity of product recipes of varying plasticity 4211 and fineness 4212 properties. The finer 42 can e.g. be enabled to refine a wide range (i.e. particle size distribution 4215) of chocolate, filling, and coating masses 421, for example, from 12 to 60 microns. Combined with a stable intake system and appropriate floating rolls 422, a refiner 42 can e.g. allow size 4214 reduction with a very narrow particle size distribution 4215 and simultaneous homogenizing 4216 and flavoring of the product. The refiner 42 can e.g. be realized as a five-roll refiner 42, i.e. comprising 5 rolls 422. However, the finer 42 can also be realized comprising another suitable number of rolls 422. The refiner 42 can e.g. be realized with different roll lengths 4225 as e.g. 1300, 1800, or 2500 mm. A variable speed 4222 setting 4232 of the second roll can e.g. enable the refiner 42 to process masses of widely varying plasticity values 4211. The intake gap 42261 can e.g. be chosen always parallel resulting in a uniform fineness 4212 distribution across the entire roll length 4225. Application of appropriate fineness measurement device 4233, in particular on-line measurement devices, can e.g. provide a permanently monitoring of the end fineness of the chocolate mass 421 and, for example, allowing to maintain its value constant by feedback to the drive speed 4222 of the second roll. This can e.g. guarantee a uniform end fineness 4212 within narrow limits even in the presence of fluctuations of the incoming product 411/35. The roller speeds 4222 and the differential roller speeds 4223, which can e.g. be matched to specific production processes and masses, and a useful utilizable roll length 4225 can e.g. enable the refiner 42 to be applied for flexible small production runs as well as for large-scale production requiring high throughput capacities 424. Controlled roll cooling 425 can e.g. be realized to allow for processing temperature-sensitive products. Further, centrifugally cast rolls can e.g. be applied having a sufficiently hard surface guaranteeing a high wear resistance. A uniformly distributed hardness can e.g. allow such rolls to be reground several times. A preferably permanent performance monitoring can e.g. help to ensure high operating reliability. Important additional characteristics of the refiner 42 may comprise (i) control of output valve of the receiving tank, (ii) control of the temperatures 4235 of the 5 rollers, (iii) control of the roller pressure 4221, (iv) control of the distance between 1-2 rollers (GAP), (v) control of the motors for rollers rotating 4232, and (vi) laser control 4236 of the thickness of the chocolate layer. Further, automatic transport, e.g. by means of a belt transport or the like, from the refiner 4 to the conche 5 can be preferable. Such a transport can e.g. comprise automatic control of the (metal) transport belts, and/or automatic control of the distributor for the respective conche 5.

The finer 42 comprises an inline, non-invasive, real-time measuring system 426 detecting vertical pattern 4263 of a roll coverage 4264 of at least one of the rolls 422 of the finer 42 with finer chocolate mass 421. By means of pattern recognition, the detected vertical pattern 4263 are compared to stored sample pattern 42621 of the pattern database 4262. In case of triggering specific error pattern 42622, at least the roll temperature 4227 and/or the roll pressure 4221 are dynamically adapted by the self-optimizing, adaptive inter-machine control system 1 providing a continuous control of the particle size distribution 4215 of finer mass 421 and a dynamically optimized throughput of the finer 42. The inline, non-invasive, real-time measuring system 426 can e.g. detect vertical pattern of a roll coverage 4264 of the fifth roll 422 of the finer 42. The inline, non-invasive, real-time measuring system 426 can e.g. comprise an optical image capturing device 4261 for imaging a surface on at least one of the rolls 422 of the finer 42 and for generating a corresponding surface image 42611, where said optical image capturing device 4261 is arranged such the imaged region covers the whole working width of said at least one roll 422, and further comprises image processing means 4265 for processing said surface image 42611. The optical device 4261 can e.g. comprise a line camera/detector or any other kind of suitable optical monitoring system. The inline, non-invasive, real-time measuring system 425 is arranged to generate a control signal on the basis of said surface image 42611 and the detected vertical pattern 4263, and to provide said control signal to adjusting means for adjusting and dynamically adapting operational parameters of said finer 42 or chocolate production process lines 11 devices 2, 3, 4, 5, 6 providing a continuous control of the particle size 4214 of finer mass 421. The optical image capturing device 4261 can e.g. be a line scan camera 42612 and said surface image 42611 then can consist of a plurality of pixels arranged in one or more lines, each of said plurality of pixels representing an area of the surface being imaged and having a pixel value corresponding to physical characteristics of said area. For example, in case of triggering specific error pattern 42622, at least the roll temperature 4227 and/or the roll pressure 4221 and/or the composition of the feed material 24 and/or fluctuations of the cooling water temperature and/or variations in the ambient temperature are dynamically adapted by the self-optimizing, adaptive machine-to-machine control system 1 providing a continuous control of the particle size 4214 of finer mass 421. The system 1 allows for a continuous control of particle size 4211 of the refiner chocolate mass 421, thereby increasing productivity of the five-roll finer 42 (e.g. up to 15%). Further, less labor skills are required (manual adaptions) that in prior art systems, thus a more consistent performance and quality is achieved by the system 1. In addition, a longer lifetime of rolls 422 is achieved due to constant and even roll wear. The real-time, inline, non-invasive control system 426 allows detecting vertical pattern 4263 of incomplete roll coverage at the 5th roll 422 of the five-roll finer 42. The measured patterns 4263 are compared to a data basis 4262 of error pattern 42622 and the right adaptations of roll temperatures 4227 or pressure 4221 is performed. Thus, operators don't have to take this responsibility and can use this time for other process related tasks. The five-roll finer 42 is one of the throughput bottleneck in the chocolate mass line 11. To run the five-roll refiner 42 with the highest possible throughput in an ideal state, the operator needs know-how and experience to find the right settings. The present system 1 measures the roll coverage of the fifth roll 422, which depends on the incoming mass consistency 4116, the target particle size 4214 but also on changes in the system environment like different raw materials, cooling water temperature fluctuations, ambient temperature changes etc. Over the detection of different patterns 4263 on the roll 422 and comparison to a pattern database 4262, the system 1 corrects the corresponding machine parameters accordingly. The roll coverage on the fifth roll 422 has a direct impact on throughput of the five-roll refiner 42. The better the coverage, the higher the throughput.

The finer 42 can e.g. further comprises an optical, inline, non-invasive, real-time measuring system 427 detecting the particle size 4214 of the finer chocolate mass 421. The particle size 4214 of the finer chocolate mass 421 can e.g. be measured by means of a near-infrared sensor device 4274 of the measuring system 427 or mechanically by means of visual/optical monitoring or by another appropriate optical system or a belt scale/weigher (where the particle size is measured based on the throughput over time and density of the chocolate mass). The particle size 4214 of the finer chocolate mass 421 can, for example, be measured based on the fat content of the finer chocolate mass 421 measured by the near-infrared sensor device 4274. Near-infrared sensors or spectroscopy (NIRS) sensors uses the near-infrared region of the electromagnetic spectrum (from about 700 nm to 2500 nm) for their measurements. Near-infrared sensor measurements are based on molecular overtone and combination vibrations. Such transitions are forbidden by the selection rules of quantum mechanics. As a result, the molar absorptivity in the near-IR region is typically quite small. One of the advantages of NIR sensors is that NIR can typically penetrate much farther into a sample than mid infrared radiation. Near-infrared spectroscopy is, therefore, not a particularly sensitive technique, but it can be very useful in probing bulk material with little or no sample preparation. The measured fat-content by means of the NIR sensors is then assigned to a particle size 4214 by the system 1, so that the particle size 4214 of the finer chocolate mass 421 can be measured, therefrom. The detected particle size 4214 of the finer chocolate mass 421 is compared to a defined target particle size 4271 and in case of triggering a deviation from the target particle size 4271, the drive speed 4222 of at least one of the rolls 422 is dynamically adapted until no deviation between the detected the particle size 4214 and the target particle size 4271 is measured. The drive speed 4222 of the second roll 422 can e.g. be dynamically adapted until no deviation between the detected the particle size 4214 and the target particle size 4271 is measured. The finer 42 can e.g. further comprise means for providing continuous or non-continuous control cycles, measuring particle size 4214 and mass distribution 4217 along at least one of the rolls 422 of the finer 42, and in case of triggering a deviation from the target particle size 4271 and/or the target mass distribution 4272, the roller pressure 4221 and/or the drive speed 4222 of at least one of the rolls 422 is dynamically adapted until no deviation between the detected the particle size 4214 and the target particle size 4271 and/or the measured mass distribution 4217 and the target mass distribution 4272 is measured. The mass distribution 4217 depends, in particular, on the roller pressure 42221 of the rolls 422 measured by the real-time measuring and control system 426. The finer 42 further can e.g. comprise means for providing continuous or non-continuous control cycles, measuring particle size 4214 and mass distribution 4217 along the fifth roll 422 of the finer 42. The system 1 thus provides a continuous control of particle size 4214 of the refiner chocolate mass 421, thus, providing highest reliability in terms of particle size 4214 and particle size distribution 4215 at all times and along the whole fifth roll 422 (in combination with particle size control). The discussed optical, real-time, non-invasive, inline measuring system 427 is installed at the five-roll refiner 42. This system 1 in combinations with the appropriate control algorithms allows determining the particle size 4214 and to compare it to a target particle size. If deviations are detected, the speed of the second roll can automatically be adjusted to guarantee an immediate achievement of the particle size 4214. In combination with the ensured even coverage of the 5th roll 422 by the embodiment variant above, it means that a constant quality at the end of the 5-roll refiner 42 can be provided which also optimizes the downstream processes of the production line 11. The even coverage enables that the particle size 4214 measurements can be accurately done and that the particle size distribution 4215 is constant, hence less production of fines and better conching conditions. It is to be noted, that a combination of the last two embodiment variants produces a more holistic quality control of particle size 4214 compared to one of the embodiment variants alone. A non-continuous control cycles can, for example, be taken over by the system, as sensor-actor-control system. Thus, the system is able to actively and accurately control particle size 4214 and mass distribution 4217 along the 5th roll 422.

The self-optimizing, adaptive industrial chocolate production system 1 can e.g. comprise a controller device 12 capturing and monitoring the measuring data 4153 of the real-time measuring system 415 of the pre-refiner 41, the measuring data 4266 of the real-time measuring system 426 of the finer 42 and the measuring data 4273 of the real-time measuring system 427 of the finer 42. The dynamic adjustment of the pressure 4121 and/or roller distance (gap) settings 4134 and/or the roller speed 4122 of the two roll pre-refiner 41 based on the measuring data 4153 of the real-time measuring system 415 of the pre-refiner 41 and the dynamic adjustment of the roll temperature 4227 and/or the roll pressure 4221 based on the measuring data 4266 of the real-time measuring system 426 of the finer 42 and the drive speed 4222 of the second roll 422 based on the measuring data 4273 of the real-time measuring system 427 of the finer 42 are mutually optimized and adjusted by means of the controller device 12. The dynamic adjustment of the roll temperature 4227 and/or the roll pressure 4221 of the pre-refiner 41 controlling the plasticity 4112 can e.g. further be based on the measured drive speed 4222 of the second roll 422 controlling the particle size 4214 and the throughput of the finer 42. The dynamic adjustment of the roll temperature 4227 and/or the roll pressure 4221 of at least one or all of the rolls 422 of the finer 42 can further be based on the roller pressure 4122 or roller gap 4126 in combination with the drive speed 4122 of the second roll 412 controlling the particle size distribution 4215 by means of the controller device 12. The central controller device 12 merges the benefits of the previous embodiment variants, i.e. capacity boost by continuous controlling of the particle size by means of vertical pattern detecting, total particle size and particle distribution control along the rolls 422 of the finer 42 and plasticity 4112 control. correlating a measured topography with the measured motor power consumption of the motor of the conveyor device or the power consumption of at least one of the rolls 412 of the pre-refiner 41. Thus, unexpected downtime due to raw material quality fluctuations and hence plasticity problems can be avoided. In addition, the system 1 provides an overall optimization of the process and process control for complete refining process 4. The installation of the inline, real-time measuring and control systems 415/426/427 on the two-roll pre-refiner 41 and the five-roll refiner 42 allows a new way of optimization of the single process steps. E.g. if plasticity 4112 is not coming ideally from the two-roll pre-refiner 41 the system can automatically adjust the five-roll refiner 42 operating parameters to a certain extent. However, if plasticity 4112 is strongly out of range, also the five-roll refiner 42 parameters cannot compensate for it. There the system 1 automatically adjusts the plasticity 4112 amending exclusively or in combination with the parameters of the refiner 42 the operational parameters of the pre-refiner 42 and/or the mixer 3 and/or the added ingredients by amending the operational parameters of the dosing means 2. Through the inter-machine communication between the five-roll refiner 42 and the two-roll pre-refiner 4, by means of the controller device 12, manual adjustment step or even downtime can be prevented by self-regulating and self-adapting the plasticity 4112 according to the needs of the five-roll refiner 42 by means of the controller device 12. Effectively, the five-roll refiner 42 sends the speed parameters of the second roll over the controller device 12 to the two-roll pre-refiner 41 so the two-roll pre-refiner 41 or the controller device 12 know that they had to change roller pressure 4121 or roller gap 4126 in order to reach the right particle size 4114 and can react on that by adjusting the plasticity 4112.

The finer 42 can be realized as a 5-roll refiner 42 comprising a removal knife at the final fifth roll 422. The finer 42 can further comprise an optical, inline, real-time measuring system 426 detecting pattern 4263 of a roll coverage 4264 of the fifth rolls 422 of the finer 42 with finer chocolate mass 421. By means of pattern recognition the detected pattern 4263 are compared to stored sample pattern 42621 of a pattern database 4262, wherein in case of triggering error pattern 42623 indicatives for a worn removal knife by means of pattern recognition of deterioration detecting means 4267, the inline, real-time measuring and control system 426 is adapted to generate an output signaling indicating or initiating a replacement of the removal knife of the fifth roll 522. The finer 42 can e.g. comprise an inline, non-invasive, real-time measuring system 426 detecting pattern 4263 of a roll coverage 4264 of at least one of the rolls 422 of the finer 42 with finer chocolate mass 421. By means of pattern recognition, the detected pattern 4263 are compared to stored sample pattern 42621 of the pattern database 4262, wherein in case of triggering specific first error pattern 42622, at least the roll temperature 4227 and/or the roll pressure 4221 are dynamically adapted by the self-optimizing, adaptive machine-to-machine control system 1 providing a continuous control of the particle size distribution 4215 of finer mass 421 and an dynamically optimized throughput of the finer 42, and wherein in case of triggering error pattern 42623 indicative for a worn removal knife by means of pattern recognition of deterioration detecting means 4267, the inline, real-time measuring and control system 426 is adapted to generate an output signaling indicating or initiating a replacement of the removal knife of the fifth roll 522.

The system 1 automatically and autonomously detects knife wear to be replaced based on the measured optical data at the fifth roll 422. If the operational parameters of the refiner 4 are correctly adjusted, the representation of the measured optical data show an ideal film. The result is full coverage. However, a machining state of the refiner 4 wherein the rolls are too cold, leads to a striped pattern, e.g. over the entire length of the roll 412/422. These stripes correspond optically measured data, which were interpreted to as an error in the film surface. Such pattern can e.g. occur, if the rolls are over pressed. In contrast, error pattern 42623, indicative for a worn removal knife, are characterized by a combination of stripes and error portions at the side of the roll 412/422. It has to be noted that although the image of the surface on the roll 422 is taken before the mass is removed from the roll by the removal knife, a worn removal knife will lead to an incomplete removal, i.e. material will remain on the roll, which in turn leads to characteristic patterns 42623. The measured optical data or line image can, for example, be taken with a CDD-line camera, and be input to image processing means comprising the pattern recognition portion. The pattern recognition portion recognizes or identifies respective patterns 42623, and the control signals are output on the basis of said recognized pattern 42623. As a variant, in case the judging signal indicates said pattern 42623 characteristic for needed removal knife 4228 replacement, deterioration detecting means can output a warning signal to a display means of an appropriate automated alarm device, such that the display means indicate a deterioration or replacement of the removal knife 4228. Said deterioration detecting means can further be adapted to output a signal to said display means, if the pattern indicates a replacement of the knife 4228, and an appropriate signal can indicate to the operator that the roll and/or knife has to be changed. In case an error pattern 42622 is recognized in the pattern recognition portion which does not indicate a deterioration or replacement of the removal knife 4228, the image processing means can e.g. output a corresponding control signal to pressure adjusting means such that the pressure adjusting means changes the pressure with which the rolls 4 and 5 are pressed against each other by a predetermined amount.

For the present invention, one or more conches 5 are used to provide appropriate mixing of the solid particulates of chocolate with liquid fat ingredients giving a desired level of smoothness and flowing liquidity of the resulting chocolate mass. The conching process 5 comprises the processes of mixing 571, drying 572, kneading/shearing 573, flavor development 574, and liquefying 575. It is to be noted, that typically, the liquefying process is a part of the conching process 5. However, it can also be realized as a separate step by an liquefyor 5a, if no conching 5 is realized in the production line 11. In the conching process 5, the solid particles are deagglomerated and individually coated with the fat phase. Evaporation of water 526 during conching 5 reduces the water content 511 of the chocolate 51 to the desired low level, for example less than about 1%. In addition to developing the desired texture 514 of the chocolate, conching also allows for improving the final flavor of the chocolate. This is due to loss of undesirable, volatile flavor components during conching 5. In other words, a conche 5 denotes a surface scraping mixer and agitator that evenly distributes cocoa butter within chocolate. The conching 5 promotes flavor development through frictional heat, release of volatiles and acids, and oxidation. In its principle, a conche is a container filled with metal beads, which act as grinders. The conche 5, as e.g. a rotary conche or long conche, can at least comprise one or more cooled jacketed conche vessels 54 containing long mixer or conching shafts 55 with radial arms or blades 554 that press the chocolate against vessel 54 sides. For small batches of chocolate, a single machine can be realized in such a way that it carries out all the steps of grinding, mixing, and conching. The refined and blended chocolate mass 51 is kept in a liquid state by frictional heat. Chocolate prior to conching 5 typically has an uneven and gritty texture. The conching process 5 produces cocoa and sugar particles smaller than the tongue can detect. The length 522 of the conching process 5 determines the final smoothness and quality of the chocolate 7. Typically, high-quality chocolate is conched for about 72 hours, and lesser grades about four to six hours. After the process 5 is complete, the chocolate mass 7 can e.g. be stored in tanks heated to about 45 to 50° C. until final processing. There are various technical designs of conches 5 possible. As mentioned, when ingredients are mixed during the conching process 5, this process may take up form several hours up to 72 hours and more, depending on the chocolate quality to be produces. The longer the process the milder, richer tastes can typically be produced. Thus, lower quality chocolate is conched, for example, for as little as six hours or less. The conching process 5 redistributes the substances from the dry cocoa that create flavor into the fat phase. Air 524 flowing through the conche 5 removes unwanted acetic, propionic, and butyric acids from the chocolate and reduces moisture 511. A small amount of moisture 511 greatly increases viscosity 512 of the finished chocolate mass 7 so machinery typically should be cleaned with cocoa butter instead of water. Some of the substances produced in roasting of cocoa beans are oxidized 515 in the conche 5, mellowing the flavor of the product. The temperature 53 of the conche 5 can e.g. be continuously measured by appropriate sensors 531, monitored and automatically controlled. It varies for different types of chocolate. Generally higher temperature 53 leads to a shorter required processing time. Temperature 513 can e.g. vary from around 49° C. for milk chocolate to up to 82° C. for dark chocolate. The elevated temperature 513 can lead to a partially caramelized flavor and in milk chocolate can promote the Maillard reaction.

The conching process 5 can e.g. involve several different stages, typically three, since the chocolate normally passes through three phases 53. In the so called dry phase 531, the material is in powdery form, and the mixing coats the particles with fat. Air movement 524 through the conche 5 removes some moisture and volatile substances, which may give an acidic note to the flavor. Moisture 511 balance affects the flavor and texture 71 of the finished product 7 because, after the particles are coated with fat, moisture 72 and volatile chemicals are less likely to escape. With other words, the conching starting material 421/51, which has been processed in the refiner 4, contains a substantial amount of the fat 516 present in the final chocolate composition, but the masse has a solid, crumbly paste or powder texture 514 because of agglomeration of the solid particles, and because most of the surfaces of the non-fat solids are freshly broken and uncoated by fat. This is, why the initial stage of conching is referred to as the dry-phase 531. As the conche 5 operates, agglomerates of solid particles are broken down and the combination of rising temperature 513 and movement of the combined materials promotes coating of the particles with the fat. At this stage moisture 511 is easily lost from the mixture, provided that the conche 5 is suitably ventilated 524. Certain undesirable flavors may also be removed from the chocolate 51 in the form of volatiles as the temperature increases. In the pasty phase 542, as second stage, more of the particles are coated with the fats 516 from the cocoa. The power required to turn the conche shafts 55 increases at this step. In the pasty-phase 532, the pasty chocolate 51 becomes less viscous 512 and the flavors are developed by shearing and thermal effects. The viscosity 512 approaches a final, steady-state, or plateau value. The final viscosity 512 is related to the amount of shear or work that is put into the chocolate. The final liquid phase 533 allows minor adjustment to the viscosity 74 of the finished product 7, which may be measured and adjusted depending on the intended use of the chocolate 7. Fats 5283 and emulsifiers 5284 are added to adjust the viscosity 512 and thoroughly mixed. Thus, in the liquid phase 533, liquid fat and emulsifier can e.g. be added to the conche 5. This liquid-phase conching stage 533, which is relatively short, mixes in the final ingredients and allows the viscosity 512 to stabilize. The conching process 5 requires the input of energy 525 in the form of mechanical energy to drive the mixing and shearing elements of the conche 5. This mechanical energy 525 is converted into thermal energy due to friction and shear in the chocolate 51, thereby heating the chocolate. Additional heating and/or cooling may be provided by suitable heating 5213 and/or cooling 5214 elements, for example a heat exchanger in the wall of the conche 5. While most conche devices 5 are batch process machines, continuous flow conches 5 separate the stages with weirs over which the product 51 travels through separate parts of the machine 5. A continuous conching 5 can reduce the conching time 522 for milk chocolate to four hours and less.

For the conching process 5, the system 1 comprises appropriate refining devices and means, which can e.g. comprise a single 551, double 552, or multiple 553 overthrow conche 5 equipped, for example, with multiple shafts 55, e.g. three shafts 55. Based on their specific geometry, typically, the agitators of a conche device 5 can e.g. be capable of either shearing or lubricating the chocolate mass, depending on the direction of rotation 527. In order to cover the specific rheological properties of the chocolate, different conche 5 designs may be suitable. Adapting the conche 5 design may allow optimal values to be achieved in terms of texture, sensory characteristics, and flavor as well as in terms of final moisture content, viscosity, and yield value. The most appropriate conche 5 design may help to ensure an ideal conching process. For example, the principle of the double-overthrow conche 552 allows short conching times thanks to an extremely high application of power. The single shaft conches 551 typically allow flexible conching with multifunctional plough shear. Further, the principles of the double-overthrow conche 552 allows short conching times thanks to an extremely high application of power. It may enable a high product quality to be achieved in terms of texture, melting characteristics, and flavor—and this in an optimized time. Specially adapted kneading and shearing characteristics of the conche 5 can ensure efficient textural modification from the dryplastic product to the liquid end product. Depending on the specific application, the conching process can be carried out in different ways in the double-overthrow conche 552. This can be further optimized by appropriate combination of process control, aeration, exact temperature control, energy input, and direction of rotation of the conching shafts 55. If a single-shaft conche 551 is used, the geometry of the conche tools is typically very important. During the conching process 5 the product is subject to the following technological process: (i) Mixing, (ii) Drying, (iii) Kneading and shearing, (iv) Flavor development (v) Liquefying. The conching device 5 according to the present invention, is in a preferred embodiment variant enabled to provide all these processes and combine them in an optimal manner, i.e. the conche 5 can be regarded as a multifunctional tool. The blade 554 of a single-shaft conche 551 can e.g. have a three-dimensional, irregularly curved surface with a wedge-shaped, parallel clearance to the vessel wall. The blade 554 is typically decisive for the conching process 5.

Depending on its capacity 541, the conche 5 can e.g. be optimized to its desired conching performance within the shortest time possible—from refiner product to flowing mass. Conching devices 5 normally can operate in the automatic or manual mode and, in the latter case, can be integrated in the process automation system of chocolate factories. Specific configurations of a plurality of rotors 55, e.g. three rotors, can be used to produce a double 552 or multiple 553 overthrow of the chocolate. The blades 555 can e.g. move synchronously and in opposite directions so that shear zones are created in addition to those existing between the rotors and the vessel 54 wall, thus producing improved conditions for an efficient conching process 5. Specially adapted, sophisticated and individually configurable interaction between process control 52, aeration 524, temperature control 521, energy input 525, and direction of rotation 527 of the conching shafts 55 or blades 554 can e.g. enable the conching device 5 for a wide range of chocolate conching variants allowing diverse masses to be processed for making a wide variety of end products according to the specific requirements. The described overthrow action 551/552/553 draws in air 524 on one side of the conche 5, forces it through the mass, and ejects it again on the other side. This can improve consistent moisture 511 extraction from the product mass 5, improving the end product 7 flavor as well as the texture 71. Further, the conche 5 can e.g. be equipped with a frequency-converter-controlled drive 523 allowing a high throughput capacity 541 and reducing the conching times 522. As an example, a continuous conching process 5 can be as realized as follows: Refiner 42 flakes are transferred into a feed hopper, its filling level controls speed of the feed screw and compensates supply variations. While some cocoa butter is added, the screw feeds the pasting columns. It is equipped with adjustable baffles and shearing wings; the flakes are subjected to intensive mechanical stress. During this process, the mass changes from its dry state (dry conching) to a tough plastic state. Cleaned conditioned air is supplied by fan. After finally adding lecithin 5282, it leaves the pasting column in flowable consistency. The mass is passed to an intermediate tank whose stirrers and wall scrapers keep the chocolate in motion to stabilize the process of the structural changes after the adding of lecithin. Process air, loaded with volatile and undesired flavor is separated. In the weighing station the recipe is completed by liquid components. The wall scraper of the vessel prepares already a pre-mixture. The exactly composed chocolate mass 51 is discharged in batches into the collecting tank. There it is further mixed and cooled. From there it is continuously pumped through the dynamic flow mixer used for intensive homogenizing. After passing a vibrating screen the chocolate mass 52 is ready for further processing. Important additional characteristics of the one or more conche 5 e.g. comprise (i) automatic dosing 528 of the extra butters 5281 or ingredients 5282, . . . , 5284 etc. in the conches 5 and start by different criteria, as for example time 522, motor power 525 and etc., (ii) automatic control of the different phases 53 of conching process 5, (iii) automatic information capturing of possible operators handling during a possible manual components adding by the system 1, and (iv) detailed monitoring and report of the conches 5 operating by the system 1.

The conche 5 can e.g. further comprise an inline, non-invasive, real-time measuring and control system 56 with a positioning encoder or sensor 561. An elevation profile 564 of the conching chocolate mass 51 along a measurement line 566 of a working area 567 is generated conducting position measurement 565 by the positioning encoder or sensor 561 along said measurement line 566. Based on the measured elevation profile 564, parameter values 511, . . . , 517 of conching chocolate mass 51 are measured. However, the parameters and elevation profile, respectively, can also be measured, for example, electro-magnetic, optical or acoustical/sonic measuring devices. In case of triggering a deviation of a measured parameter value 511, . . . , 517 of a target parameter value 511, . . . , 517, at least one of the operational parameters 521-528 of the conche 5 is dynamically adapted by the control and monitoring system 52 aligning the measured parameter values 511, . . . , 517 with the target parameter values 511, . . . , 517. The positioning encoder or sensor 561 can e.g. be an optical or electro-magnetic or acoustical positioning encoder or sensor 561. The measured parameter value of conching chocolate mass 51 can e.g. provide a measure of the consistency of the conche mass 51. The measurement line 566 of the elevation profile 564 of the conching chocolate mass 51 can e.g. be along the length of the conche vessels 54 and/or the length of the inner surface of conche vessel 542, and wherein the inner surface of conche vessel 542 provides the working area 567. This variant provides an adaptive, self-optimizing operation of the conche 5 and the conching process. Further, reduces the typically time- and energy-consuming conching process 5 in terms of used conching time 522 and energy 525. The dynamic adjustment and adaption of the operation parameters allow to provide a fully automated conching process at a new level of efficiency, which is not possible by human operators or manual interaction.

The control and monitoring system 52 of the conche 5 can e.g. further comprise a fat content measuring device 529 measuring the fat content 516 of conche mass 51 (lean conching 86). The initial fat content 2412 of the basic chocolate mass 35 is dynamically adapted by the dosing means 2 in case of triggering a deviation of the measured fat content 516 of conche mass 51 to a target fat content 516 of conche mass 51. The system 1 allows a complete automation and does not need manual adjustment of the operating parameters of the chocolate production line 11 in order to achieve a desired target fat content 73 of the end product chocolate mass 7. No operator is needed with highly specialized empirical know-how and operating experience. In addition, the fat contribution of the fat 2412 containing ingredients 24 is typically conducted by the dosing means 2 and the mixer 3, and not in the conching device 5. Thus, there are many reasons for deviations of the effective fat content 73 of the end product 7 from the target fat content of the receipt, as e.g. faulty dosage (in particular there are typically up to six mixer batches for a conching process), or manual adaption of the operating or dosing parameters by the operator in order to achieve a preferred plasticity. The system 1 does not need manual adjustment of the operating parameters of the chocolate production line 11 due to its adaptive, self-optimizing inter-machine optimization of the operating parameters between the conche 5 and the mixer-dosing means 2/3 by means of the controller and steering device 12 of the adaptive system 1.

A controller device 12 of the self-optimizing, adaptive inter-machine control system 1 can e.g. captures and monitors the measuring data 4153 of the real-time measuring system 415 of the pre-refiner 41, the measuring data 4266 of the real-time measuring system 426 of the finer 42 and the measuring data 4273 of the real-time measuring system 427 of the finer 42. The dynamic adjustment of the pressure 4121 and/or roller distance (gap) settings 4134 and/or roller speed 4122 of the two roll pre-refiner 41 based on the measuring data 4153 of the real-time measuring system 415 of the pre-refiner 41 and the dynamic adjustment of the roll temperature 4227 and/or the roll pressure 4221 based on the measuring data 4266 of the real-time measuring system 426 of the finer 42 and the drive speed 4222 of the second roll 422 based on the measuring data 4273 of the real-time measuring system 427 of the finer 42 can thus be mutually optimized and adjusted as operational parameters by means of the controller device 12. In case of having optimally adjusted said operational parameters and in case of trigging a deviation of a measured throughput to a predicted throughput of the chocolate mass under optimally adjusted said operational parameters, a wear of rolls 422 of the finer 42 or the rolls 412 of the pre-refiner 41 is measured and monitored and an output signaling indicating or initiating replacement and/or optimal time of replacement of the appropriate roll is generated. This variant enables the system 1 to automatically and autonomously detect wear of rolls to be replaced or otherwise adjusted.

Even the most sophisticated and processed chocolate mass 7 will not reach the level of final production before it has been formed. Crystallization, e.g. seed precrystallization, optimal depositing processes and appropriate shell forming technology typically form the final steps. However, for the last two main steps in the chocolate process 11, the conched chocolate mass 51 is processed as chocolate mass 61 by molding 63 and/or tempering 64 to the end product 9, for example, into bulk bars or the conched chocolate mass 51 can go into another production cycle to produce specialized retail products, such as coated-candy centers and molded items. I.e., after the conching process 5 the chocolate mass 61 is appropriately moulded 63, tempered 64, deposited 65, formed 66 and enrobed 67. The different steps 62-67 can partially be formed by integrated processes. For example, shell forming can be achieved through brief and fast stamping using a cooled die. The process can happen so quickly that the mass crystallized into a molded shape just barely has sufficient stability, wherein a temperature and time relating mechanism can ensure perfect shell quality and economic production.

Quality control measurements can be realized through the entire production chain 11 by measuring the quality of chocolate and cocoa butter, but in particular before entering the end chocolate mass 7 in the final processing steps 6 to achieve the end product 9. For example, the cooling curve of cocoa butter can be measured by a tempermeter. Information about the quality of the cocoa butter can e.g. be provided using an appropriate crystallization index (CI). An index value (e.g. 1 to 6) can, for example, indicate whether the chocolate mass is suitable for further processing or if any potential problems or quality defects can be expected in production. The quality control measuring device 62 can further be realized to provide information about the quality of the raw cocoa butter before processing, which helps to protect against unpleasant surprises before, during and after being molded as final processing steps. The quality control measuring device 62 can e.g. be realized to provide cocoa butter analysis, by measuring the solidification curve of the chocolate at varying temperatures.

The chocolate mass 61 can be further processed by the moulding means 63 to the end product 9, e.g. solid chocolate articles as well as one-shot filled articles. The moulding line 63 can provide e.g. spot, ribbon and one-shot depositing in continuously moving moulds. But it can also be applied for the production of filled articles (shell, filling, back). The possible mould sizes can e.g. range from 620 mm to 1200 mm or other ranges with a defined mechanical line capacity, as for example maximum 35 moulds per minute. For the moulding line 63, a crucial factor for achieving easy removal of the articles from the moulds as well as uniform crystallization of the chocolate is an appropriate integration of a gentle cooling technology. For example, the vibration and cooling sections can be carefully separated through insulated panels. Due to the uniform tempering of the entire moulds, an optimal product gloss can be obtained with an optimal demoulding quality. High-precision depositing processes and optimal shaking can e.g. ensure a constant article weight and quality in each individual cavity. This can produce article continuity from mould to mould. The moulding chain 63 can, for example, further be driven by reliable motors, e.g. servo motors, whose number is specified on an individual basis. They can guarantee a smooth mould motion within the entire line, thus ensuring uniform and parallel chocolate bars. The tension of the transport chain for complete mould conveyance on the moulding line 63 can be centrally controllable and adjustable, if required, by means of the inter-machine connectivity control and steering 8. An appropriate quick-exchange system for the depositor can enable the mass hopper and piston system or depositing tool, i.e. nozzle plate or shutter knife, to be exchanged in a short time. This allows a faster article change, for example from smooth masses to masses with whole inclusions, or to a system for one-shot depositing or a system for aerated masses. In addition, by using a loose moulding line, roto-spinning moulding line, continuous moulding line etc., to the traditional wet-shell forming process 66, shells can also be produced using, for example, cold stamping processes 66.

The tempering process 64 is necessary, since an uncontrolled crystallization 612 of cocoa butter typically results in crystals of varying size. This causes the surface of the chocolate to appear mottled and matte, and causes the chocolate to crumble rather than snap when broken. The uniform sheen and crisp bite of properly processed chocolate are the result of consistently small cocoa butter crystals 612 produced by the tempering process 64. Further, properly tempered chocolate also allows for molding candies because the candies will release out of the molds more easily and still retain a glossy finish. Additionally, tempering prevents bloom, where the cocoa butter separates from the cocoa solids and comes to the surface, turning the chocolate whitish or grayish in color. If chocolate mass 7 or the end product 9 has to be produced that won't be consumed within a day or so, typically it is assumed that tempering is absolutely mandatory for all chocolates containing real cocoa butter. The fats in cocoa butter can crystallize in six different forms 613 (polymorphous crystallization). The primary purpose of tempering 64 is to assure that only the desired form is present, since the six different crystal forms 613, denoted I-VI, have different properties. Generally, the chocolate is first heated to 45° C. to melt all six forms of crystals 613. Next, the chocolate is cooled to about 27° C., which will allow crystal types IV and V to form. At this temperature, the chocolate is agitated to create many small crystal "seeds" which will serve as nuclei to create small crystals in the chocolate. The chocolate is then heated to about 31° C. to eliminate any type IV crystals, leaving just type V. After this point, any excessive heating of the chocolate will destroy the temper and this process will have to be repeated. However, other methods of chocolate tempering can be used. The most common variant is introducing already tempered, solid "seed" chocolate. The crystallization 612 of chocolate can be measured with a chocolate termermeter 641 to ensure accuracy and consistency. Important additional characteristics of the tempering means 6 may comprise (i) automatic transfer of a chocolate mass from the conches 5 to the tanks for its storing and tempering 6, and (ii) detailed monitoring and reporting of the transferred mass to the tanks by the system 1. The precrystallization process in chocolate production can e.g. also rely on seed crystallization, instead of the conventional tempering machine. Seed crystallization can allow to produce a cocoa butter crystal suspension (CBCS), which is then can be added at a continuous rate to the chocolate, filling, or nougat mass. The β-V and β-VI crystals can e.g. be dispersed in the viscosity-controlled mixing unit, where they seed crystallization. An optimized crystallization process can significantly reduce the scrap rate and downtimes: (i) For a given tempering degree, the tempering device can achieve a lower viscosity, and the mass can spread optimally throughout the mould during depositing; (ii) Improving removal from the mould and contraction of the chocolate mass, the end product can be more easily demoulded.

Tempering, according to the present invention and as performed by the tempering means 64, at least, provides a controlled heating and cooling of the chocolate mass 61 to achieve appropriate coating, dipping or molding. Since the cocoa butter of the chocolate mass 61 was originally extracted from the cocoa or cacao bean, real chocolate, i.e. chocolate containing cocoa butter, requires going through a tempering procedure based on the nature of cocoa butter, which re-establishes the cocoa butter crystals, giving the cooled and finished chocolate the proper sheen, snap and taste. The chocolate temper meter 641 of the tempering means 64 allows the adaptive machine-to-machine control system 1 to measure if the chocolate mass 61 is correctly tempered to achieve the proper cocoa butter crystals. This can be accomplished, for example, in that thermal electric cooling wells utilize a closed loop circuit to ensure that the cooling of a sample of the chocolate mass 61 remains within +/−0.1 degree. Typically, a small temperature range is critical to ensure that measurement with temper meters 641 are consistent. For example, with a heated thermistor probe periodic temperature readings (e.g. every five seconds) can be taken as the chocolate is cooled. At the completion of a sufficiently long run, a slope of the time vs. temperature curve can be provided by the temper meter 641. The slope reading allows the system 1 to know the degree in which the chocolate mass 61 is over or under temper. Based on the measurements, the control system 1 can adapt the operating parameters of the tempering machines 64 to achieve the best temper possible, thus providing an optimally tempered chocolate mass 7. Finally, the tempering 64 can e.g. comprise an additional preceding liquefying, during which the mass can e.g. additionally be liquefied by adding cocoa butter or other fats. In addition, the mass can be ground by circulation through a mill, as e.g. a horizontal ball mill. Typically, the liquefying process is a part of the conching process 5. However, it can also be realized as a separate step by an liquefyor 5a, if no conching 5 is applied.

Depositor 65 can preferably be realized, for example, as a multifunctional, precise depositor 65 having an appropriate capacity 651 and depositing chocolate and filling masses of various viscosities, with or without ingredients. Depositor's 65 operation typically is extremely dependable on its precision. Thus, depositor 65 can e.g. be designed for high-capacity operation and a systematic, automatically adaptable flexibility offering in combination of spot and ribbon deposit, ribbon depositing, or one-shot depositing mode. An appropriately wide selection of different pistons and depositing molds can further allow a great product variety to be processed. A controller 652 attached directly to the machine 65 can allow easy and convenient control by means of the self-optimizing, adaptive machine-to-machine control system 1. Optimized settings 653 for every article can e.g. be saved in the recipe memory and ensure absolute reproducibility. As mentioned, the depositing machine 65 can preferably be synonymous with high precision in the depositing of chocolate masses and fillings. The products 9, that the depositor 65 can process, can e.g. range from smooth masses for backing, lid, or shell chocolate and decorations to the entire range of liquid and semi-liquid fillings. Such a depositor 65 can e.g. deposit liquors, marmalade, or caramel as accurately as fat fillings of truffles and nougat, for example, by spot depositing or one-shot depositing etc. If the depositor 65 is realized as a single-piston depositing system, this can allow highly accurate depositing of small volumes. If the depositor 65 includes a flow-through system, it is also possible to accurately deposit very small chocolate volumes. I.e. the depositor 65 can e.g. be realized providing spot depositing in stationary molds and/or moving molds.

Shell forming 66 can e.g. be realized as a cold stamping system 661 or a wet shell formation system 662, or another shell forming technology. If the shell forming system 66 is realized as a cold stamping system, it can offer other possibilities in the production of chocolate shells as an alternative to conventional centrifugal processes (wet shell formation), in particular providing more accurate weight, regular geometry, and uniform wall thickness. Fast stamping using a special cooled die can e.g. allow shells to be formed with high precision. The weight, geometry, and wall thickness are more accurate—ensuring high-class chocolate products 9. Further, such process improves by providing a uniform wall thickness the visual appearance of the product 9 because fat bloom is retarded. Moreover, in this case 661, the homogeneous shells can offer consumers a better "bite" than is achieved with those produced by a conventional process 662.

By connecting all the described measuring parameters, the system 1 provides an overall process optimization and automation encompassing the whole chocolate production line 11 and production process. Thus, the controller device 12 of the self-optimizing, adaptive machine-to-machine control system 1 can capture and monitor the measuring data 4153 of the real-time measuring system 415 of the pre-refiner 41 and/or the measuring data 4266 of the real-time measuring system 426 of the finer 42 and/or the measuring data 4273 of the real-time measuring system 427 of the finer 42 and/or the measuring data 5291 of the fat content measuring device 529 of the conche 5. The dynamic adjustment of the pressure 4121 and/or roller distance (gap) settings 4134 of the two roll pre-refiner 41 based on the measuring data 4153 of the real-time measuring system 415 of the pre-refiner 41 and/or the dynamic adjustment of the roll temperature 4227 and/or the roll pressure 4221 based on the measuring data 4266 of the real-time measuring system 426 of the finer 42 and/or the dynamical adjustment of the drive speed 4222 of the second roll 422 based on the measuring data 4273 of the real-time measuring system 427 of the finer 42 and/or the dynamic adjustment of the initial fat content 355 of the basic chocolate mass 35 by the dosing means 3, can be mutually optimized and adjusted as operational parameters by means of the controller device 12. Therefore, the system 1 is enabled to measure appropriate inter-dependent operational parameters of the various devices 2/3/4/5/6 in real-time by real-time measuring devices 415/426/427/528/529 and to transmit them to a central machine-to-machine controller device 12. The measured inter-dependent operational parameters can be mutually optimized and dynamically adjusted providing an optimal operation at least in terms of the characteristics of the end chocolate mass 7 and/or throughputs of the chocolate production line 11 and/or other operation conditions as the overall energy consumption, production time etc.

As an example of the self-optimizing, adaptive inter-machine control system 1, where the overall machine-to-machine control, optimization and communication is provided by the inter-machine control system 1, the various processing steps in the chocolate production line 11 are mutually influencing each other. The technical goal, as provided by the present system 1, is that the chocolate production line is enabled to bring itself in an ideal operation status, inter alia with highest possible throughput and constant characteristics and quality of the chocolate mass. In this embodiment variant, the structure of the conching chocolate mass 51 is measured (as described above, for example by measuring the viscosity of the conching chocolate mass 51). The structure can be influenced by the particle size 518 of the sugar. If the structure is running out of a tolerance range, and if the parameters cannot be corrected in the conching process itself, the required particle size is changed in the finer 42. However, another particle size requires other operational parameters of the finer 42, which are controlled by the described sensor/actor system (optical, inline, non-invasive, real-time measuring system 427) and corrected by adjusting the drive speed 4222 of at least one of the rolls 422, for example the second roll of the rolls 422. To reach an ideal operation status, the finer 42, e.g. realized as five rolls finer 42, now request an amended plasticity 4112 from the pre-finer 41, since the plasticity 4112 influences the grinding significantly. However, if the pre-refiner 41 is not able to reach the requested plasticity 4112 within the possible operational parameter ranges of the pre-finer 41, the pre-finer 41 request an amended composition (adapted fat content 2412 of the feed materials 24) of the compound materials of the basic chocolate mass 35 respectively of the compounds of the feed materials 24 from the mixer 3 and/or the dosing means 2. However, since the overall fat content 73 of the end chocolate mass 7 must be constant, a different dosing of the fat contribution in the conche 5 is required, i.e. the fat contribution of the mixer 571 during the conching process 5 must be appropriately adapted by the system 1. Thus, there is also a machine-to-machine or inter-machine communication and/or control and/or steering via the control system 1 from the mixer 3 to the conche 5. In a basic embodiment variant, the self-optimizing, adaptive inter-machine control system 1 is realized on a master-slave control between a master device 2/3/4/5/6 and a slave device 2/3/4/5/6, wherein if one of the parameters, as describe above, cannot be corrected within a device, i.e. dosing means 2, mixer 3, refiner 4 (pre-finer 41 and finer 42), conche 5 and tempering means 6, by adapting or adjusting its operational parameters, this device acts as a master device, requesting from the appropriate slave device (see above) a corresponding adjustment of the specific characteristics of the chocolate mass. Such an adjustment may require a further adjustment of further operational parameters of further devices, wherein in such a case, the slave device becomes a master device in the further adjustment, and so on. The operational parameters are thus adapted by the described serial master-slave adaptions, until an ideal processing status of the chocolate production line 11 is achieved again. As measuring parameter for measuring the overall ideal operation of the production line 11, for example, the Overall Equipment Effectiveness (OEE) 13 of the chocolate production 11 can be measured by OEE measuring devices.

Although this optimization process works well for most of the application, a further optimization can be achieved by means of multi-dimensional operational parameter optimization over all devices 2/3/4/5/6. For example, the system 1 can comprise a discretized voxels structures in from of a polyhedral meshwork structure, wherein a combination of measured material attributes and/or relevant operational parameters of the chocolate production line 11 are mapped onto the discretized voxels of the polyhedral meshwork structure. The polyhedral meshwork structure is defined in an adaptable number of dimensions, each representing an individual material or chocolate mass state 24/35/411/421/51/61/7/9, when mapped onto each face or an edge or a vertex of the meshwork polyhedron. Said individual material or chocolate mass state 24/35/411/421/51/61/7/9 can e.g. be represented by means of material attribute functional coefficients, e.g. by means of floating point material attribute functional coefficients, when mapped onto each face or an edge or a vertex of a meshwork polyhedron. Said individual material can e.g. also be represented by means of integer functional coefficients, or by means of short word functional coefficients, when mapped onto each face or an edge or a vertex of a meshwork polyhedron 18, or by means of byte type functional coefficients, when mapped onto each face or an edge or a vertex of a meshwork polyhedron. For said combination, all material attributes from the simulated processing of the chocolate mass can e.g. be stored by means of the voxels, described above, wherein the system 1 is optimizing by varying over all operational or material values represented by the voxels in the regular grid of this multi-dimensional parameters space. However, other approaches of process optimization and automated decision making structures can be used as well, if they are suitable to adjust the chocolate production process so as to optimize the above-specified set of parameters without violating the corresponding constraint. Optimizing the OEE, the most important goals can be achieved, as e.g. minimizing cost and maximizing throughput and/or efficiency. When optimizing the present process, for example, the goal can be achieved by maximizing one or more of the process/operational parameter specifications, while keeping all others within their constraints. The inter-machine control system 1, thus, works as a process mining device, discovering the critical activities and bottlenecks, and acting only on them. The control system 1 can e.g. comprise appropriate control loops. Each control loop is responsible for controlling one part of the process 2/3/4/5/6, such as maintaining a temperature, level, or flow of the processes or devices 2/3/4/5/6. If the control loop is properly designed and tuned, the process runs in its optimum 131, otherwise below or above its optimum 132/133. Outside the ideal operation of the chocolate production line 11, process will be more expensive to operate, and equipment will wear out prematurely, or the required quality or characteristics of the end chocolate mass product 7/9 is not achieved. For each control loop to run optimally, the identification of the herein described sensor, valve, and tuning problems is essential. The present inter-machine control system 1 allows to provide a process of continuously monitoring and optimizing the entire chocolate production line 11, in particular an automated performance supervision.

LIST OF REFERENCE SIGNS

1 Self-optimizing, adaptive inter-machine control system
  11 Chocolate production process lines
  12 Controller device
  13 Overall Equipment Effectiveness (OEE) of the chocolate production
    131 OEE in green range, i.e. optimal operation
    132 OEE in upper red range, i.e. no optimized operation possible
    133 OEE in lower red range, i.e. no optimized operation possible
2 Dosing means
  21 Discharger
    211 Vibro-Discharger
  22 Feeder
    221 Vibroprocess vibrating feeder
      2211 Electromechanical vibrating feeder
      2212 Electromagnetic vibrating feeder
      2213 Mechanical vibrating feeder
    222 Vibrating dosing feeders
  23 Conveyor
    231 Screw conveyors
    232 Tubular screw conveyors
  24 Feed material of the chocolate production line: Cacao, Sugar & . . .
    241 Initial particle properties
      2411 State of aggregation
        24111 Liquid
        24112 Dry/Granular/Solid
      2412 Initial fat content
      2413 Temperature
      2414 Particle size
    242 Initial upstream process parameters
      2421 Amount of extracted material 243
      2422 Size of dosing machines
3 Mixer and mixing
  31 Mixing device/agitator unit (mixing)
    311 Spiral stirring unit
    312 Temperature control
    313 Independent mixing tubs
  32 Kneader
  33 Shearing device/cutter unit (size reduction)
  34 Disperser disc (homogenization and liquefying)
  35 Basic chocolate mass
    351 Plasticity parameter of the basic chocolate mass 35
    352 Homogeneity parameter of the basic chocolate mass 35
    353 Viscosity of basic chocolate mass 35
    354 Temperature of basic chocolate mass 35
    355 Initial fat content
  36 Variable-speed-drive
  37 Conveying device to refiner 4
    371 Measured power consumption of conveying device
    372 Power consumption measuring device
4 Refiner and Refining
  41 Pre-Fining Device
    411 Pre-Fining chocolate mass
      4111 Viscosity of Pre-Refiner mass
      4112 Plasticity of Pre-Refiner mass
      4113 Fineness of Pre-Refiner mass
      4114 Particle sizes of Pre-Refiner mass
      4115 Particle size distribution of Pre-Refiner mass
      4116 Consistency of Pre-Refiner mass
    412 Rolls of Pre-Refiner
      4121 Roller pressure
      4122 Roller speed
      4123 Differentials roller speed
      4124 Roller crown
      4125 Roll length
      4126 Roller gap
      4127 Roller temperature
    413 Control and monitoring system
      4131 Roller pressure control system
      4132 Roller speed (motor) control system
      4133 Fineness measurement device
      4134 Roller distance and setting control system
      4135 Temperature control system
    414 Capacity of Pre-Refiner
    415 Inline, real-time measuring and control system
      4151 Light source (laser)
      4152 Optical image capturing device (camera)
      4153 Measuring data
  42 Finer and fining
    421 Refiner chocolate mass
      4211 Plasticity of refiner chocolate mass 421
      4212 Fineness of refiner chocolate mass 421
      4213 Viscosity of refiner mass 421
      4214 Particle sizes of refiner mass 421
      4215 Particle size distribution of refiner mass 421
      4216 Homogeneity of refiner mass 421
      4217 Mass distribution
    422 Rolls of Refiner
      4221 Roller pressure
      4222 Drive (roller) speed
      4223 Differentials roller speed
      4224 Roller crown
      4225 Roll length
      4226 Roller gap
        42261 Intake roller gap (roller 1 and 2)
      4227 Temperature of the rollers
      4228 Removal knife
    423 Control and monitoring system
      4231 Roller pressure control system
      4232 Roller speed control system
      4233 Fineness measurement device
      4234 Gap control and gap setting control system
      4235 Temperature control system
      4236 Chocolate layer thickness measuring system (laser)
    424 Capacity of Refiner
    425 Roller cooling
    426 Real-time measuring and control system (pattern)
      4261 Optical image capturing device
        42611 Surface image of a roll 422
        42612 Line scan camera
      4262 Pattern database
        42621 Sample pattern of pattern database
        42622 Error pattern
        42623 Pattern characteristic of worn removal knife 4263 Vertical pattern
4264 Roll coverage with finer chocolate mass 421
4265 Image processing means
4266 Measuring data
4267 Deterioration detecting means
427 Optical, real-time measuring and control system (particle size)
4271 Target particle size
4272 Target mass distribution (i.e. roll coverage with preferably left-middle-right equal particle size)
4273 Measuring data
4274 Near-Infrared sensor device
5 Conche and Conching
51 Conching chocolate mass
511 Moisture (water content) of conching mass 51
512 Viscosity of conching mass 51
513 Temperature of conching mass 51
514 Texture of conching mass 51
515 Oxidization
516 Fat content of conching mass 51
517 Consistency of the conching mass 51
518 Particle size of the sugar
52 Control and monitoring system
521 Temperature control
5211 Temperature sensor
5212 Temperature of conche
5213 Heating elements
5214 Cooling elements
522 Conching time
523 Frequency-converter-controlled drive
524 Aeration
525 Energy input
526 Evaporation/Reduction of water content
527 Direction of rotation of the conching shafts or blades
528 Automatic dosing of additional ingredients
5281 Cacao butter
5282 Lecithin
5283 Fats
5284 Emulsifiers
529 Fat content measuring device
5291 Fat content measuring parameters
53 Three phases of conching
531 Dry phase
532 Pasty phase
533 Liquid phase
54 Conche vessels
541 Capacity of conche 5
542 Inner surface of conche vessel
55 Conching shafts/rotors
551 Single overthrow conche
552 Double overthrow conche
553 Multiple overthrow conche
554 Radial arms or blades or shearing elements
56 Inline, non-invasive, real-time measuring and control system
561 Optical, electro-magnetic or acoustical positioning encoder or sensor
562 Optical image capturing device (camera)
563 Light source (laser)
564 Elevation profile
565 Position measurement
566 Measurement line
567 Working area
57 Conching processes
571 Mixing
572 Drying
573 Kneading and shearing
574 Flavor development
575 Liquefying
5751 Liquefyor
5752 Additional ingredients 621
57521 Cacao butter 6211
57522 Additional fats
5753 Additional grinding means
57531 Mill
57532 Ball mill
5a Liquefying means (in a production line 11 without conches 5)
5a1 Additional ingredients
5a11 Cacao butter
5a12 Additional fats
5a2 Grinding means
5a21 Mill
5a22 Ball mill
6 Tempering/Moulding/Enrobing means
61 Chocolate mass
611 Moisture (water content) of mass 61
612 Degree of crystallization or the cocoa butter/fats crystals
613 Crystallization forms (1-VI) of cocoa butter fats
614 Viscosity of mass 61
615 Temperature of mass 61
616 Texture of mass 61
617 Fat content of mass 61
62 Chocolate mass control measuring (quality characteristics)
621 Tempermeter
63 Moulding line
64 Tempering means
641 Chocolate tempermeter
65 Depositing/Depositor
651 Capacity
652 Controller
653 Product settings
66 Shell forming
661 Cold stamping system
662 Wet shell formation system
67 Enrobing
7 End chocolate mass
71 Texture of end chocolate mass
72 Moisture (water content) of end chocolate mass 7
73 Overall fat content of end chocolate mass 7
74 Viscosity of end chocolate mass 7
8 Inter-Machine Connectivity Control and Steering
81 Prediction Roll Wear
82 Self-Running Refining
83 Plasticity Control
84 Total Particle Size Control
85 Capacity Boost
86 Lean Conching
9 End product: Tablets, bars, chocolate articles . . .
91 Texture of end product
92 Moisture (water content) of end product 9
93 Fat content of end product 9
94 Viscosity of end product 9

The invention claimed is:

1. A self-optimizing, adaptive industrial chocolate production system, the system comprising:
   a chocolate mass processing line including
     a doser;
     one or more mixers;
     one or more refiners comprising a pre-refiner and a finer, the pre-refiner having at least two pre-refiner rollers having a controlled roller pressure and/or roller gap/distance and speed and/or roller temperature, and
       an inline, real-time measuring circuitry configured to measure changes in the plasticity of the pre-fining chocolate mass,
     the finer having a plurality of finer rollers having a controlled roller pressure and/or roller temperature and/or roller gap/distance and speed;
     one or more conches or one or more liquefiers, each of the conches at least comprising a container or conche vessel having an inner surface and at least one moveable shaft or rotatable rotor situated inside said conche vessel; and
     a temperer having a temper meter for measuring crystallization, wherein
   solid and/or liquid feed materials are precisely dosed, conveyed and discharged to the one or more mixers by the closer,
   the feed materials are mixed and/or kneaded to a basic chocolate mass with a defined plasticity and homogeneity by the one or more mixers and transferred to the one or more refiners,
   the basic chocolate mass is pre-processed to a chocolate mass with a predefinable plasticity and fineness by the at least two pre-refiner rollers, and processed to a refiner chocolate mass with a predefinable powder fineness by the plurality of finer rollers, and transferred to the one or more conches,
   the refiner chocolate mass is processed to a conching chocolate mass with a given moisture, viscosity, texture and fat content by the one or more conches and transferred to the temperer, wherein the shearers press the conching chocolate mass against the vessel surface during operation and/or between overlapping shearing elements, wherein the conching chocolate mass is processed to a predefined moisture, degree of crystallization, and fat content by adding cocoa butter and/or other fats by the liquefier, and wherein the chocolate mass as final conching chocolate mass is processed to the end product at least by the temperer varying temperature to achieving the predefined degree of crystallization measured by the temper meter; and
   an adaptive machine-to-machine control circuitry configured to automatically adjust the pressure and/or roller distance (gap) settings of the pre-refiner to provide an autonomous plasticity control with a given plasticity parameter value,
   wherein the finer comprises a non-invasive, real-time measuring circuitry configured to detect a vertical pattern of a roller coverage of at least one of the finer rollers with finer chocolate mass, wherein pattern recognition the detected vertical pattern is compared to stored sample patterns, wherein in case of triggering a specific error pattern, at least the roller temperature and/or the roller pressure are dynamically adapted by the adaptive machine-to-machine control circuitry providing a continuous control of a particle size distribution of finer mass and a dynamically optimized throughput of the finer.

2. The self-optimizing, adaptive industrial chocolate production system according to claim 1, wherein the adaptive machine-to-machine control circuitry is configured to systematically adjust the given plasticity parameter value based on measuring parameters of the refiner or by manual input to the adaptive machine-to-machine control circuitry.

3. The self-optimizing, adaptive industrial chocolate production system according to claim 1, wherein the pre-refiner is a two-roll refiner, with automatically adjustable gap-settings of the two pre-refiner rollers varying the gap between the pre-refiner rollers upon amending the gap-setting parameters.

4. The self-optimizing, adaptive industrial chocolate production system according to claim 1, further comprising a chocolate mass conveyor configured to convey the basic chocolate mass to the refiner, wherein the inline, real-time measuring circuitry comprises at least a light source and/or an optical image capturing circuitry and/or a measuring circuitry for measuring a power consumption of the chocolate mass conveyor and/or a measuring device for measuring a throughput of the basic chocolate mass, wherein a throughput of the basic chocolate mass is measured by line triangulation of the light source and the optical image capturing device, and wherein the plasticity of the pre-fining chocolate mass is dynamically controlled based on a constant value of the throughput in combination with the measured power consumption of the chocolate mass conveying device.

5. The self-optimizing, adaptive industrial chocolate production system according to claim 4, wherein the pre-refiner rollers of the pre-refiner define an inlet zone, a topography of the chocolate mass is assessed in the inlet zone of the pre-refiner rollers of the pre-refiner by the line triangulation based on a fan shape of a centrally projected laser or light source lines, wherein the throughput of the chocolate mass is dynamically measured based on the assessed typography, and the adaptive machine-to-machine control circuitry is configured to automatically adjust the pressure and/or roller distance settings of the pre-refiner rollers of the pre-refiner to provide a predefined value of the plasticity by keeping the constant value of the throughput of the chocolate mass in combination with the measured power consumption of the conveying device.

6. The self-optimizing, adaptive industrial chocolate production system according to claim 4, wherein the light source is a laser or multiline laser or LED projectors and/or the optical image capturing circuitry is a camera or a multiline laser measuring sensor or triangulation sensor.

7. The self-optimizing, adaptive industrial chocolate production system according to claim 1, wherein the finer comprises first through fifth finer rollers, and the non-invasive, real-time measuring circuitry detects the vertical pattern of the roller coverage of the fifth finer roller of the finer.

8. The self-optimizing, adaptive industrial chocolate production system according to claim 1, wherein the non-invasive, real-time measuring circuitry comprises an optical image capturing circuitry configured to image a region of a surface on at least one of the finer rollers of the finer and for generating a corresponding surface image, where said optical image capturing circuitry is arranged such the imaged region covers a whole working width of said at least one of the finer rollers of the finer, and further comprises image processing circuitry for processing said surface image.

9. The self-optimizing, adaptive industrial chocolate production system according to claim 1, further comprising adjusting circuitry configured to adjust and dynamically adapt operational parameters for the chocolate mass processing line to provide a continuous control of particle size of the refiner chocolate mass, and wherein the non-invasive, real-time measuring circuitry is configured to generate a control signal in accordance with said surface image and the detected vertical pattern, and to provide said control signal to the adjusting circuitry.

10. The self-optimizing, adaptive industrial chocolate production system according to claim 1, wherein the optical image capturing circuitry is a line scan camera, and said surface image includes a plurality of pixels arranged in one or more lines, each of said plurality of pixels representing an area of the surface being imaged and having a pixel value corresponding to physical characteristics of said area.

11. The self-optimizing, adaptive industrial chocolate production system according to claim 1, wherein in response to triggering a specific error pattern, the adaptive machine-to-machine control circuitry is configured to dynamically adapt at least the roller temperature and/or the roller pressure of the finer rolls and/or a composition of the feed materials and/or fluctuations of a cooling water temperature and/or variations in ambient temperature providing a continuous control of the particle size of finer mass.

12. A self-optimizing, adaptive industrial chocolate production system the system comprising:
a chocolate mass processing line including
a doser;
one or more mixers;
one or more refiners comprising a pre-refiner and a finer, the pre-refiner having at least two pre-refiner rollers having a controlled roller pressure and/or roller gap/distance and speed and/or roller temperature, and
an inline, real-time measuring circuitry configured to measure changes in the plasticity of the pre-fining chocolate mass,
the finer having a plurality of finer rollers having a controlled roller pressure and/or roller temperature and/or roller gap/distance and speed;
one or more conches or one or more liquefiers, each of the conches at least comprising a container or conche vessel having an inner surface and at least one moveable shaft or rotatable rotor situated inside said conche vessel; and
a temperer having a temper meter for measuring crystallization, wherein
solid and/or liquid feed materials are precisely dosed, conveyed and discharged to the one or more mixers by the doser;
the feed materials are mixed and/or kneaded to a basic chocolate mass with a defined plasticity and homogeneity by the one or more mixers and transferred to the one or more refiners,
the basic chocolate mass is pre-processed to a chocolate mass with a predefinable plasticity and fineness by the at least two pre-refiner rollers and processed to a refiner chocolate mass with a predefinable powder fineness by the plurality of finer rollers, and transferred to the one or more conches,
the refiner chocolate mass is processed to a conching chocolate mass with a given moisture, viscosity, texture and fat content by the one or more conches and transferred to the temperer, wherein the shearers press the conching chocolate mass against the vessel surface during operation and/or between overlapping shearing elements, wherein the conching chocolate mass is processed to a predefined moisture, degree of crystallization, and fat content by adding cocoa butter and/or other fats by the liquefier, and wherein the chocolate mass as final conching chocolate mass is processed to the end product at least by the temperer varying temperature to achieving the predefined degree of crystallization measured by the temper meter; and
an adaptive machine-to-machine control circuitry configured to automatically adjust the pressure and/or roller distance (gap) settings of the pre-refiner to provide an autonomous plasticity control with a given plasticity parameter value,
wherein the finer further comprises an optical, inline, non-invasive, real-time measuring system detecting a particle size of the finer chocolate mass, wherein the detected particle size of the finer chocolate mass is compared to a defined target particle size, and in response to triggering a deviation from the target particle size, the adaptive machine-to-machine control circuitry is configured to dynamically adapt a drive speed of at least one of the finer rollers until no deviation between the detected particle size and the target particle size is measured.

13. The self-optimizing, adaptive industrial chocolate production system according to claim 12, further comprising a near-infrared sensor, wherein the particle size of the finer chocolate mass is measured by the near-infrared sensor.

14. The self-optimizing, adaptive industrial chocolate production system according to claim 13, wherein the particle size of the finer chocolate mass is measured based on a fat content of the finer chocolate mass measured by the near-infrared sensor.

15. The self-optimizing, adaptive industrial chocolate production system according to claim 12, wherein the finer rollers comprise first and second finer rollers, and wherein the adaptive machine-to-machine control circuitry is configured to dynamically adapt the drive speed of the second finer roller until no deviation between the detected particle size and the target particle size is measured.

16. The self-optimizing, adaptive industrial chocolate production system according to claim 12, wherein the finer further comprises circuitry configured to provide continuous or non-continuous control cycles, measure the particle size and a mass distribution along at least one of the finer rollers of the finer, and in response to triggering a deviation from the target particle size and/or the target mass distribution, dynamically adapt the roller pressure or the drive speed of at least one of the finer rollers until no deviation between the detected the particle size and the target particle size and/or the measured mass distribution and the target mass distribution is measured, wherein the measured mass distribution depends on the roller pressure of the finer rollers.

17. The self-optimizing, adaptive industrial chocolate production system according to claim 16, wherein the finer rollers comprise first through fifth finer rollers, and wherein the finer further comprises circuitry configured to provide control cycles, measuring the particle size and the mass distribution along the fifth finer roller.

18. The self-optimizing, adaptive industrial chocolate production system according to claim 1, wherein the finer further comprises an additional real-time measuring circuitry, and wherein the adaptive machine-to-machine control circuitry is configured to capture and monitor measuring data of the inline, real-time measuring circuitry of the pre-refiner, measuring data of the non-invasive real-time measuring system of the finer and measuring data of the additional real-time measuring system of the finer, and to mutually optimize and adjust the dynamic adjustment of the pressure and/or roller distance settings of the two roll pre-refiner based on the measuring data of the inline, real-time measuring circuitry of the pre-refiner and the dynamic adjustment of the roll temperature and/or the roll pressure based on the measuring data of the additional real-time measuring circuitry of the finer and the drive speed of the second roll based on the measuring data of the additional real-time measuring circuitry of the finer.

19. The self-optimizing, adaptive industrial chocolate production system according to claim 18, wherein the finer rollers comprise first, second, third, fourth, and fifth finer rollers, and wherein the adaptive machine-to-machine control circuitry is further configured to dynamically adjust the roller pressure and/or roller distance of the pre-refiner in combination with the roller speed controlling the plasticity further based on the measured drive speed of the second finer roller controlling the particle size and the throughput of the finer, and to dynamically adjust the roll temperature and/or the roller pressure of at least one of the finer rollers of the finer.

20. The self-optimizing, adaptive industrial chocolate production system according to claim 1, wherein the finer rollers comprise first, second, third, fourth, and final fifth rollers, wherein the finer is a roll refine comprising a removal knife at the final fifth roller, wherein the finer comprises an optical, inline, real-time measuring circuitry configured to detect a pattern of a roll coverage of the final fifth roller of the finer with finer chocolate mass, wherein by pattern recognition the detected pattern are compared to stored sample pattern, wherein in response to triggering error pattern indicative for a worn removal knife by the pattern recognition, the inline, real-time measuring and control circuitry is adapted to generate an output signaling indicating or initiating a replacement of the removal knife.

21. The self-optimizing, adaptive industrial chocolate production system according to claim 1, wherein the finer comprises a removal knife and an inline, non-invasive, real-time measuring circuitry configured to detect a pattern of a roll coverage of at least one of the finer rollers of the finer with the finer chocolate mass and compare the detected pattern by pattern recognition to the stored sample patterns, wherein in response to triggering a specific first error pattern, adaptive machine-to-machine control circuitry is configured to dynamically adapt at least the roll temperature and/or the roll pressure providing a continuous control of the particle size distribution of finer mass and a dynamically optimized throughput of the finer, and wherein in response to triggering an error pattern indicative for a worn removal knife by the pattern recognition, the inline, real-time measuring circuitry is adapted to generate an output signaling indicating or initiating a replacement of the removal knife.

22. A self-optimizing, adaptive industrial chocolate production system the system comprising:
a chocolate mass processing line including
  a doser;
  one or more mixers;
  one or more refiners comprising a pre-refiner and a finer, the pre-refiner having at least two pre-refiner rollers having a controlled roller pressure and/or roller gap/distance and speed and/or roller temperature, and
  an inline real-time measuring circuitry configured to measure changes in the plasticity of the pre-fining chocolate mass,
  the finer having a plurality of finer rollers having a controlled roller pressure and/or roller temperature and/or roller gap/distance and speed;
  one or more conches or one or more liquefiers, each of the conches at least comprising a container or conche vessel having an inner surface and at least one moveable shaft or rotatable rotor situated inside said conche vessel; and
  a temperer having a temper meter for measuring crystallization, wherein
solid and/or liquid feed materials are precisely dosed, conveyed and discharged to the one or more mixers by the doser,
the feed materials are mixed and/or kneaded to a basic chocolate mass with a defined plasticity and homogeneity by the one or more mixers and transferred to the one or more refiners,
the basic chocolate mass is pre-processed to a chocolate mass with a predefinable plasticity and fineness by the at least two pre-refiner rollers, and processed to a refiner chocolate mass with a predefinable powder fineness by the plurality of finer rollers, and transferred to the one or more conches,
the refiner chocolate mass is processed to a conching chocolate mass with a given moisture, viscosity, texture and fat content by the one or more conches and transferred to the temperer, wherein the shearers press the conching chocolate mass against the vessel surface during operation and/or between overlapping shearing elements, wherein the conching chocolate mass is processed to a predefined moisture, degree of crystallization, and fat content by adding cocoa butter and/or other fats by the liquefier, and wherein the chocolate mass as final conching chocolate mass is processed to the end product at least by the temperer varying temperature to achieving the predefined degree of crystallization measured by the temper meter; and
an adaptive machine-to-machine control circuitry configured to automatically adjust the pressure and/or roller distance (gap) settings of the pre-refiner to provide an autonomous plasticity control with a given plasticity parameter value,
wherein each of the one or more conches further comprises an inline, non-invasive, real-time measuring and control circuitry with a positioning encoder or sensor, configured to generate an elevation profile of the conching chocolate mass along a measurement line of a working area by conducting position measurement by the positioning encoder or sensor along said measurement line, wherein based on the measured elevation, the non-invasive, real-time measuring and control circuitry of said each of the one or more conches is configured to measure profile parameter values of coaching chocolate mass, and wherein in response to triggering a deviation of a measured parameter value of a target parameter value, the inline, non-invasive, real-time measuring and control circuitry of said each of the conches is configured to dynamically adapt at least one of the operational parameters of said each of the conches aligning the measured parameter values with target parameter values.

23. The self-optimizing, adaptive industrial chocolate production system according to claim 22, wherein the positioning encoder or sensor is an optical or electro-magnetic or acoustical positioning encoder or sensor.

24. The self-optimizing, adaptive industrial chocolate production system according to claim 22, wherein the measured parameter values of the conching chocolate mass provides a measure of consistency of the conching chocolate mass.

25. The self-optimizing, adaptive industrial chocolate production system according to claim 22, wherein the measurement line of the elevation profile of the conching chocolate mass is along a length of the conche vessels and/or a length of the inner surface of conche vessels, and wherein the inner surface of conche vessel provides a working area.

26. The self-optimizing, adaptive industrial chocolate production system according to claim 22, wherein the inline, non-invasive, real-time measuring and control circuitry of the said each of the conche vessels is configured to measure an added fat of the feed material providing a fat content of the conche mass, wherein an initial fat content of the basic chocolate mass is dynamically adapted by the closer in response to triggering a deviation of the measured fat content of conche mass to a target fat content of conche mass, and/or the fat content of the conche mass is dynamically adapted by amending roller characteristics of the refiner.

27. The self-optimizing, adaptive industrial chocolate production system according to claim 18, wherein adaptive machine-to-machine control circuitry is configured to capture and monitor the measuring data of the real-time measuring circuitry of the pre-refiner, the measuring data of the non-invasive real-time measuring circuitry of the finer and the measuring data of the additional real-time measuring system of the finer, and mutually optimize and adjust the dynamic adjustment of the pressure and/or roller distance of the pre-refiner, and wherein in response to having optimally adjusted said operational parameters and in response to trigging a deviation of a measured throughput to a predicted throughput of the chocolate mass under optimally adjusted said operational parameters, measure and monitor a wear of the rollers of the finer or the rollers of the pre-refiner and generate an output signaling indicating or initiating replacement and/or optimal time of replacement of an appropriate roller.

28. The self-optimizing, adaptive industrial chocolate production system according to claim 18, wherein said each of the conche vessels comprises inline, non-invasive, real-time measuring and control circuitry configured to measure an elevation profile and/or fat dosing, wherein the adaptive machine-to-machine control circuitry is configured to capture and monitor the measuring data of the inline real-time measuring circuitry of the pre-refiner and/or the measuring data of the non-invasive real-time measuring circuitry of the finer and/or the measuring data of the additional real-time measuring circuitry of the finer and/or the measured elevation profile and/or the measured fat dosing, and to dynamically and mutually optimize dynamic adjustment of the pressure and/or roller distance and/or roller speed of the pre-refiner and/or dynamic adjustment of the roll temperature and/or the roll pressure of the finer and/or dynamical adjustment of the drive speed of the second roll and/or the dynamic adjustment of the initial fat content of the basic chocolate mass, as operational parameters.

29. The self-optimizing, adaptive industrial chocolate production system according to claim 22, wherein the inline, non-invasive, real-time measuring and control circuitry of said each of the conch vessels is configured to measure fat content based on the measured elevation profile.

* * * * *